(12) United States Patent
Kawai

(10) Patent No.: US 11,399,145 B2
(45) Date of Patent: Jul. 26, 2022

(54) IMAGE PROCESSING DEVICE, IMAGING APPARATUS, IMAGE PROCESSING METHOD, AND PROGRAM

(71) Applicant: FUJIFILM Corporation, Tokyo (JP)

(72) Inventor: Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/157,684

(22) Filed: Jan. 25, 2021

(65) Prior Publication Data

US 2021/0152763 A1 May 20, 2021

Related U.S. Application Data

(63) Continuation of application No. PCT/JP2019/023128, filed on Jun. 11, 2019.

(30) Foreign Application Priority Data

Jul. 27, 2018 (JP) .............................. JP2018-141678

(51) Int. Cl.
H04N 5/225 (2006.01)
H04N 5/357 (2011.01)
(Continued)

(52) U.S. Cl.
CPC ............. *H04N 5/357* (2013.01); *G06T 5/002* (2013.01); *H04N 5/2351* (2013.01); *H04N 5/2353* (2013.01)

(58) Field of Classification Search
CPC .... H04N 5/345; H04N 5/3452; H04N 5/3454; H04N 5/357; H04N 5/3653
See application file for complete search history.

(56) References Cited

U.S. PATENT DOCUMENTS

2006/0082841 A1* 4/2006 Shiratani .............. H04N 5/2259
358/474
2006/0262974 A1* 11/2006 Watanabe ............ H04N 5/3456
382/167

(Continued)

FOREIGN PATENT DOCUMENTS

JP 2003-087644 A 3/2003
JP 2006-108889 A 4/2006

(Continued)

OTHER PUBLICATIONS

International Search Report issued in PCT/JP2019/023128; dated Aug. 20, 2019.

(Continued)

*Primary Examiner* — Twyler L Haskins
*Assistant Examiner* — Dwight Alex C Tejano
(74) *Attorney, Agent, or Firm* — Studebaker & Brackett PC

(57) ABSTRACT

An image processing device includes a image processor that reads out image data which is captured by an imaging element and transferred to a memory and on which optical noise is superimposed, as region image data for each of a plurality of divided regions of the memory, and that reads out data of a predetermined region again after reading for each region image data is finished, and an display processor that outputs corrected image data obtained by correcting captured image data for each of the plurality of regions in accordance with optical noise decided in accordance with the data read out again by the image processor, the captured image data being captured by the imaging element and stored in the memory.

16 Claims, 20 Drawing Sheets

(51) Int. Cl.
   *G06T 5/00*   (2006.01)
   *H04N 5/235*   (2006.01)

(56) References Cited

U.S. PATENT DOCUMENTS

| | | | |
|---|---|---|---|
| 2008/0018761 A1 | 1/2008 | Kondo et al. | |
| 2012/0320228 A1* | 12/2012 | Imade | G06T 3/4069 |
| | | | 348/220.1 |
| 2013/0201401 A1* | 8/2013 | Hirooka | H04N 5/21 |
| | | | 348/607 |
| 2016/0028985 A1* | 1/2016 | Vogelsang | H04N 5/376 |
| | | | 348/294 |
| 2017/0230569 A1* | 8/2017 | Sambonsugi | H04N 5/378 |

FOREIGN PATENT DOCUMENTS

| | | |
|---|---|---|
| JP | 2008-028516 A | 2/2008 |
| JP | 2010-050535 A | 3/2010 |
| JP | 2011-216966 A | 10/2011 |
| JP | 2012-134756 A | 7/2012 |

OTHER PUBLICATIONS

International Preliminary Report On Patentability and Written Opinion issued in PCT/JP2019/023128; dated Feb. 2, 2021.

* cited by examiner

FIG. 7

ALL PIXELS [4896 × 3264] (3:2)

| Row | | | | | | | | | Field |
|---|---|---|---|---|---|---|---|---|---|
| 1ST ROW | R | G | R | G | R | G | R | G | → TO FIRST FIELD |
| 2ND ROW | G | B | G | B | G | B | G | B | → TO SECOND FIELD |
| 3RD ROW | R | G | R | G | R | G | R | G | → TO THIRD FIELD |
| 4 = (n+1)-TH ROW | G | B | G | B | G | B | G | B | → TO FIRST FIELD |
| 5 = (n+2)-TH ROW | R | G | R | G | R | G | R | G | → TO SECOND FIELD |
| 6 = (n+3)-TH ROW | G | B | G | B | G | B | G | B | → TO THIRD FIELD |
| 7 = (2n+1)-TH ROW | R | G | R | G | R | G | R | G | → TO FIRST FIELD |
| 8 = (2n+2)-TH ROW | G | B | G | B | G | B | G | B | → TO SECOND FIELD |
| 9 = (2n+3)-TH ROW | R | G | R | G | R | G | R | G | → TO THIRD FIELD |
| 10 = (3n+1)-TH ROW | G | B | G | B | G | B | G | B | → TO FIRST FIELD |
| 11 = (3n+2)-TH ROW | R | G | R | G | R | G | R | G | → TO SECOND FIELD |
| 12 = (3n+3)-TH ROW | G | B | G | B | G | B | G | B | → TO THIRD FIELD |

FIG. 8A

FIRST FIELD
- 1ST ROW
- 4 = (n+1)-TH ROW
- 7 = (2n+1)-TH ROW
- 10 = (3n+1)-TH ROW

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |

FIG. 8B

SECOND FIELD
- 2ND ROW
- 5 = (n+2)-TH ROW
- 8 = (2n+2)-TH ROW
- 11 = (3n+2)-TH ROW

| G | B | G | B | G | B | G | B |
|---|---|---|---|---|---|---|---|
| R | G | R | G | R | G | R | G |
| G | B | G | B | G | B | G | B |
| R | G | R | G | R | G | R | G |

FIG. 8C

THIRD FIELD
- 3RD ROW
- 6 = (n+3)-TH ROW
- 9 = (2n+3)-TH ROW
- 12 = (3n+3)-TH ROW

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |

IMAGE PROCESSING DEVICE, IMAGING APPARATUS, IMAGE PROCESSING METHOD, AND PROGRAM

CROSS-REFERENCE TO RELATED APPLICATIONS

This application is a continuation application of International Application No. PCT/JP2019/023128, filed Jun. 11, 2019, the disclosure of which is incorporated herein by reference in its entirety. Further, this application claims priority under 35 USC 119 from Japanese Patent Application No. 2018-141678 filed Jul. 27, 2018, the disclosure of which is incorporated by reference herein.

BACKGROUND

1. Technical Field

The technology of the present disclosure relates to an image processing device, an imaging apparatus, an image processing method, and a program.

2. Related Art

A CMOS image sensor generally uses a sequential reading method called a rolling shutter. An image sensor that implements an electronic global shutter by, while using the CMOS image sensor, disposing an electric charge accumulation unit adjacent to pixels and transferring electric charges to the electric charge accumulation unit at the same time from all pixels is also known. In a case of employing a global shutter method, electric charges generated by photoelectric conversion in photoelectric conversion elements are stored in the electric charge accumulation unit until the electric charges are read out after exposure is finished.

However, while the electric charges are read out as image information after being stored in the electric charge accumulation unit, electric charges caused by other than the exposure may be generated and superimposed on the electric charge accumulation unit due to stray light or the like to a photodiode and/or the electric charge accumulation unit. The superimposed electric charges act as noise called optical noise and exert an adverse effect on a captured image.

In order to reduce such noise, for example, JP2012-134756A discloses an imaging apparatus that performs a control for exposing all pixels at the same time, transferring electric charges of light accumulated in a photoelectric conversion unit to only a first accumulation unit by driving a first transfer unit of all pixels comprised in a pixel unit at a timing of finish of exposure, reading out electric charges accumulated in the first accumulation unit as an optical signal through a first amplification unit, a first connection unit, and a first output signal line, and reading out electric charges accumulated in a second accumulation unit as an optical noise signal through a second amplification unit, a second connection unit, and a second output signal line. According to this configuration, since only optical noise electric charges are accumulated in the second accumulation unit, an optical noise removal signal can be acquired.

JP2006-108889A discloses a solid-state imaging device that obtains signals of one row or one column by subtracting signals of a first row or column and a second row or column in an imaging apparatus of a sequential reading method after signal electric charges of all pixels are transferred to an accumulation unit (floating diffusion (FD)) at the same time. This solid-state imaging device can acquire an image signal of a high S/N in which all pixels are subjected to an exposure time period at the same time, and is appropriate for high-speed imaging such as a strobe light adjustment signal, an automatic focusing signal, or motion picture imaging for an electronic view finder or the like.

JP2008-028516A discloses a camera system configured by disposing a MOS imaging element that comprises a pixel unit in which a plurality of pixels each including a photodiode, an electric charge accumulation unit, a transfer transistor, a reset transistor, an amplification transistor, and a selection transistor are two-dimensionally arranged, and that resets a signal of the photodiode for all pixels at the same time and sequentially performs a signal reading operation from the pixels after the signal is transferred to the electric charge accumulation unit from the photodiode after a predetermined time period, and a stop mechanism 3 as an incidence ray quantity changing unit that suppresses a quantity of light incident during the signal reading operation of the MOS imaging element from each pixel. Accordingly, a camera system that has a global shutter function and can prevent signal deterioration and occurrence of aliasing even at a time of high brightness subject imaging can be provided.

JP2011-216966A discloses an imaging element comprising a high brightness detection unit of a signal processing unit that detects a voltage value corresponding to a current value of an overflow drain for each unit pixel of a pixel array unit as a quantity of light reception in units of pixels, a level analysis unit that obtains an order of light reception levels in units of rows for the pixels constituting the pixel array unit based on the voltage value read out by the high brightness detection unit and registers the order in an address list, the signal processing unit that updates an address list of a system control unit with information about the address list, and the system control unit that sequentially reads out a light reception signal from the pixel array unit in units of rows from the highest position in the order in units of rows in the address list. Accordingly, in a case of capturing an image by an image sensor, occurrence of noise can be reduced.

SUMMARY

However, in the technologies disclosed in JP2012-134756A, JP2006-108889A, JP2008-028516A, and JP2011-216966A, it is difficult to obtain a captured image in which optical noise is suppressed, without changing a mechanical configuration of an imaging element or an imaging apparatus.

One embodiment of the present disclosure provides an image processing device, an imaging apparatus, an image processing method, and a program capable of obtaining a captured image in which optical noise is suppressed, without changing a mechanical configuration of an imaging element or an imaging apparatus.

An image processing device according to a first aspect comprises a reading unit that reads out image data which is captured by an imaging element including a plurality of photoelectric conversion elements and transferred to a memory unit and on which optical noise is superimposed, as region image data for each of a plurality of divided regions of the memory unit, and that reads out data of a predetermined region again after reading for each region image data is finished, and an output unit that outputs corrected image data obtained by correcting captured image data for each of the plurality of regions in accordance with optical noise decided in accordance with the data read out again by the reading unit, the captured image data being captured by the imaging element and stored in the memory unit. Accordingly, a captured image in which the optical noise is suppressed can be obtained without changing a mechanical configuration of the imaging element or an imaging apparatus.

In the image processing device according to a second aspect, the predetermined region is a region read out first from the memory unit. Accordingly, data of only the optical noise of the longest time period can be acquired, and an optical noise amount closer to reality can be measured and corrected.

In the image processing device according to a third aspect, based on a comparison result between a pair of region image data adjacent in a reading order of the reading unit, the corrected image data is obtained by deciding a pixel position having the optical noise from region image data that is later in the reading order of the reading unit, and correcting the captured image data for each region in accordance with the decided pixel position and an amount of the optical noise. Accordingly, an occurring position and an amount of the optical noise can be separately accurately obtained.

In the image processing device according to a fourth aspect, the comparison result is a difference between image data of the pair of adjacent region image data. Accordingly, the occurring position of the optical noise can be accurately obtained.

In the image processing device according to a fifth aspect, the plurality of photoelectric conversion elements have sensitivity to each of a plurality of predetermined primary colors. Accordingly, application can be made to a color imaging element.

In the image processing device according to a sixth aspect, each region image data is region image data in which the image data stored in the memory unit is thinned out in units of groups in which the photoelectric conversion elements having sensitivity to each of the plurality of primary colors have predetermined arrangement. Accordingly, detection accuracy of the optical noise in the color imaging element is improved.

In the image processing device according to a seventh aspect, the comparison result is a result of comparison after the pair of region image data are subjected to demosaicing. Accordingly, detection accuracy of the optical noise in the color imaging element is improved.

In the image processing device according to an eighth aspect, the pixel position is decided based on a result of performing filter processing on the comparison result of the pair of region image data, or the pixel position is decided based on the comparison result of comparison after the pair of region image data are subjected to the filter processing. Accordingly, detection accuracy of the optical noise in a case where a narrow or high-contrast subject is imaged is improved by low-pass filter processing.

In the image processing device according to a ninth aspect, in a case where a predetermined imaging condition is satisfied, the reading unit performs processing of reading out the data again after reading for each of a plurality of the region image data is finished. Accordingly, optical noise correction processing can be executed only in a case of an imaging condition in which optical noise correction is necessary.

In the image processing device according to a tenth aspect, the imaging condition is at least one of a condition that an imaging time period of the imaging element is shorter than a predetermined time period, or a condition that an image region of which brightness exceeds predetermined brightness is present in the image data stored in the memory unit. Accordingly, the optical noise correction processing can be executed only in a case of the imaging condition.

The image processing device according to an eleventh aspect further comprises an acquisition unit that acquires optical noise characteristic information indicating characteristics of optical noise for each of the plurality of regions from a storage unit in which the optical noise characteristic information is prestored, in which the corrected image data is obtained by correcting the captured image data for each region in accordance with the optical noise and the optical noise characteristic information acquired by the acquisition unit. Accordingly, the optical noise correction can be accurately performed by acquiring the optical noise characteristic information in advance.

In the image processing device according to a twelfth aspect, the optical noise characteristic information is a value based on a ratio of a predetermined value as optical noise of the region read out again by the reading unit among the plurality of regions and a predetermined value as optical noise of another region different from the region among the plurality of regions. Accordingly, the optical noise correction can be quickly performed.

An image processing device according to a thirteenth aspect comprises a reading unit that reads out image data which is captured by an imaging element including a plurality of photoelectric conversion elements and transferred to a memory unit and on which optical noise is superimposed, as region image data for each of a plurality of divided regions of the memory unit, and an output unit that outputs corrected image data obtained by correcting captured image data for each of the plurality of regions in accordance with optical noise decided in accordance with the region image data read out for each of the plurality of regions by the reading unit, the captured image data being captured by the imaging element and stored in the memory unit. Accordingly, a captured image in which the optical noise is suppressed can be obtained without changing a mechanical configuration of the imaging element or an imaging apparatus.

In the image processing device according to a fourteenth aspect, based on a comparison result between a pair of region image data adjacent in a reading order of the reading unit, the corrected image data is obtained by deciding a pixel position having a difference from region image data that is later in the reading order of the reading unit, and correcting the captured image data for each region in accordance with the decided pixel position and the difference. Accordingly, a captured image in which the optical noise is suppressed can be obtained without changing a mechanical configuration of the imaging element or an imaging apparatus. In the image processing device according to a fifteenth aspect, the region is obtained by thinning out, in units of rows using a predetermined method, the memory unit of the photoelectric conversion elements arranged using a matrix manner. Accordingly, a technology for reading out a field can be applied.

The image processing device according to a sixteenth aspect further comprises a control unit that performs a control for displaying, on a display unit, an image based on the corrected image data output by the output unit. Accordingly, the corrected image data can be displayed.

An imaging apparatus according to a seventeenth aspect comprises the image processing device according to any one of the first aspect to the fifteenth aspect, and a reception unit that receives an instruction to cause the imaging element to start imaging. Accordingly, an imaging apparatus having an optical noise correction function can be obtained.

An image processing method according to an eighteenth aspect comprises reading out image data which is captured by an imaging element and transferred to a memory unit and on which optical noise is superimposed, as region image data for each of a plurality of divided regions of the memory unit, and reading out data of a predetermined region again after reading for each region image data is finished, and outputting corrected image data obtained by correcting captured image data for each of the plurality of regions in accordance with optical noise decided in accordance with the data read out again, the captured image data being captured by the imaging element and stored in the memory unit.

An image processing method according to a nineteenth aspect comprises reading out image data which is captured by an imaging element and transferred to a memory unit and on which optical noise is superimposed, as region image data for each of a plurality of divided regions of the memory unit, and outputting corrected image data obtained by correcting captured image data for each of the plurality of regions in accordance with optical noise decided in accordance with the region image data read out for each of the plurality of regions, the captured image data being captured by the imaging element and stored in the memory unit.

A program according to a twentieth aspect is a program causing a computer to execute a process comprising reading out image data which is captured by an imaging element and transferred to a memory unit and on which optical noise is superimposed, as region image data for each of a plurality of divided regions of the memory unit, and reading out data of a predetermined region again after reading for each region image data is finished, and outputting corrected image data obtained by correcting captured image data for each of the plurality of regions in accordance with optical noise decided in accordance with the data read out again, the captured image data being captured by the imaging element and stored in the memory unit.

A program according to a twenty-first aspect is a program causing a computer to execute a process comprising reading out image data which is captured by an imaging element and transferred to a memory unit and on which optical noise is superimposed, as region image data for each of a plurality of divided regions of the memory unit, and outputting corrected image data obtained by correcting captured image data for each of the plurality of regions in accordance with optical noise decided in accordance with the region image data read out for each of the plurality of regions, the captured image data being captured by the imaging element and stored in the memory unit.

An image processing device according to another embodiment is an image processing device including a processor and a memory, in which the processor executes a process including reading out image data which is captured by an imaging element and transferred to a memory unit and on which optical noise is superimposed, as region image data for each of a plurality of divided regions of the memory unit, and reading out data of a predetermined region again after reading for each region image data is finished, and outputting corrected image data obtained by correcting captured image data for each of the plurality of regions in accordance with optical noise decided in accordance with the data read out again, the captured image data being captured by the imaging element and stored in the memory unit.

An image processing device according to another embodiment is an image processing device including a processor and a memory, in which the processor executes a process including reading out image data which is captured by an imaging element and transferred to a memory unit and on which optical noise is superimposed, as region image data for each of a plurality of divided regions of the memory unit, and outputting corrected image data obtained by correcting captured image data for each of the plurality of regions in accordance with optical noise decided in accordance with the region image data read out for each of the plurality of regions by the reading unit, the captured image data being captured by the imaging element and stored in the memory unit.

According to one embodiment of the present disclosure, a captured image in which optical noise is suppressed can be obtained without changing a mechanical configuration of an imaging element or an imaging apparatus.

BRIEF DESCRIPTION OF THE DRAWINGS

Exemplary embodiments of the present invention will be described in detail based on the following figures, wherein:

FIG. 6A is a time chart according to one embodiment, and FIG. 6B is a time chart of a technology in the related art;

FIG. 7 is one example of a method of dividing a region of the imaging element according to the first embodiment;

FIGS. 8A to 8C are diagrams illustrating one example of arrangement of elements of each field: FIG. 8A illustrates pixel arrangement of a first field, FIG. 8B illustrates pixel arrangement of a second field, and FIG. 8C illustrates pixel arrangement of a third field;

DETAILED DESCRIPTION

First, abbreviations used in the present specification will be described. An abbreviation "PLS" stands for "Parasitic Light Sensitivity". An abbreviation "CMOS" stands for "Complementary Metal Oxide Semiconductor". An abbreviation "OVF" stands for "Optical View Finder". An abbreviation "EVF" stands for "Electric View Finder". An abbreviation "LCD" stands for "Liquid Crystal Display". An abbreviation "I/F" stands for "Interface". An abbreviation "CPU" stands for "Central Processing Unit". An abbreviation "ROM" stands for "Read Only Memory". An abbreviation "RAM" stands for "Random Access Memory". An abbreviation "EEPROM" stands for "Electrically Erasable Programmable Read Only Memory". An abbreviation "ASIC" stands for "Application Specific Integrated Circuit". An abbreviation "FPGA" stands for "Field Programmable Gate Array". An abbreviation "PLD" stands for "Programmable Logic Device". An abbreviation "LAN" stands for "Local Area Network". An abbreviation SSD stands for "Solid State Drive". An abbreviation USB stands for "Universal Serial Bus". An abbreviation DVD-ROM stands for "Digital Versatile Disc Read Only Memory". An abbreviation "SoC" stands for "System On Chip". An abbreviation "IC" stands for "Integrated Circuit". An abbreviation "PDA" stands for "Personal Digital Assistants". An abbreviation "GPS" stands for "Global Positioning System". An abbreviation "OELD" stands for "Organic Electro Luminescence Display". An abbreviation "JPEG" stands for "Joint Photographic coding Experts Group". An abbreviation "RFID" stands for "Radio Frequency Identification". An abbreviation "SIM" stands for "Subscriber Identity Module". An abbreviation "UIM" stands for "User Identity Module Card". An abbreviation "I/O" stands for "Input/Output".

First Embodiment

Figure 1:
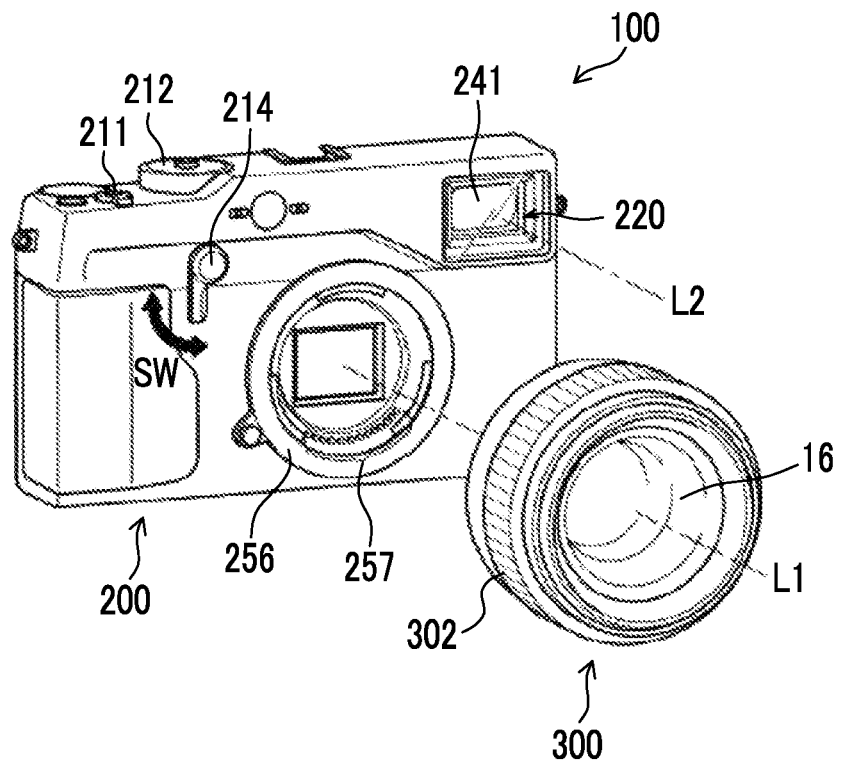
FIG. 1 is a schematic perspective view illustrating one example of an exterior of an imaging apparatus according to a first embodiment.
Figure 2:
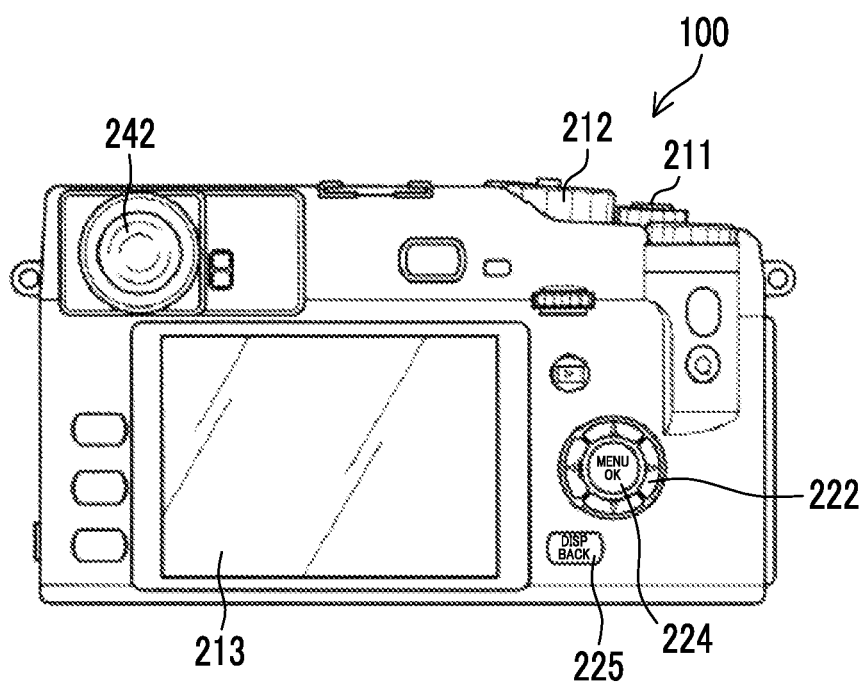
FIG. 2 is a rear view of the imaging apparatus illustrated in FIG. 1.

Hereinafter, one example of an embodiment of the technology of the present disclosure will be described with reference to the drawings. FIG. 1 is a perspective view illustrating one example of an exterior of an imaging apparatus 100 according to a first embodiment. FIG. 2 is a rear view of the imaging apparatus 100 illustrated in FIG. 1. The imaging apparatus to which the embodiment described below can be applied includes imaging apparatuses such as a digital camera and a digital video camera, and imaging modules mounted on an electronic endoscope, a camera-equipped mobile phone, and the like. A digital camera will be illustratively described here.

The imaging apparatus 100 is an interchangeable lens camera and is a digital camera that includes a camera main body 200 and an interchangeable lens 300 interchangeably mounted on the camera main body 200 and does not include a reflex mirror. A hybrid finder (registered trademark) 220 is disposed in the camera main body 200. Here, for example, the hybrid finder 220 refers to a finder in which an OVF and an EVF can be selectively used.

The camera main body 200 and the interchangeable lens 300 are interchangeably mounted by joining a mount 256 comprised in the camera main body 200 and a mount 346 (refer to FIG. 3) of an interchangeable lens 300 side corresponding to the mount 256. The interchangeable lens 300 includes an imaging lens 16 and a focus lens 302 and transmits an optical image of a subject to an imaging element of the camera main body 200.

A finder window 241 of the OVF included in the hybrid finder 220 is disposed on a front surface of the camera main body 200. In addition, a finder switching lever 214 is disposed on the front surface of the camera main body 200. In a case where the finder switching lever 214 is rotationally moved in a direction of an arrow SW, an optical image that is visually recognizable by the OVF, and a live view image that is an electronic image visually recognizable by the EVF are selectively displayed. An optical axis L2 of the OVF is an optical axis different from an optical axis L1 of the interchangeable lens 300. In addition, a release button 211 and a dial 212 for setting such as an imaging mode or a playback mode are mainly disposed on an upper surface of the camera main body 200.

A finder eyepiece unit 242 of the OVF, a display unit 213, a cross key 222, a menu key 224, and a selection button 225 are disposed on a rear surface of the camera main body 200 illustrated in FIG. 2.

The cross key 222 has a function as a multifunction key that outputs various instruction signals for menu selection, zooming, frame advance, or the like. The menu key 224 is an operation key that has both of a function as a menu button for providing an instruction to display a menu on a screen of the display unit 213 and a function as an OK button for providing an instruction for confirmation, execution, and the like of a selected content. The selection button 225 is used for deleting a display content such as a selected item and/or canceling a designated content or, for example, returning to an immediately previous operation state.

For example, the display unit 213 is implemented by an LCD and is used for displaying the live view image that is one example of a consecutive frame image obtained by imaging in consecutive frames at a time of the imaging mode. Here, the "live view image" is generally called a "live preview image". The display unit 213 is also used for displaying a still image that is one example of a single frame image obtained by imaging in a single frame in a case where an instruction to capture a still image is provided. Furthermore, the display unit 213 is used for displaying a playback image at a time of the playback mode or displaying a menu screen or the like. The display unit 213 may be a touch panel display.

Figure 3:
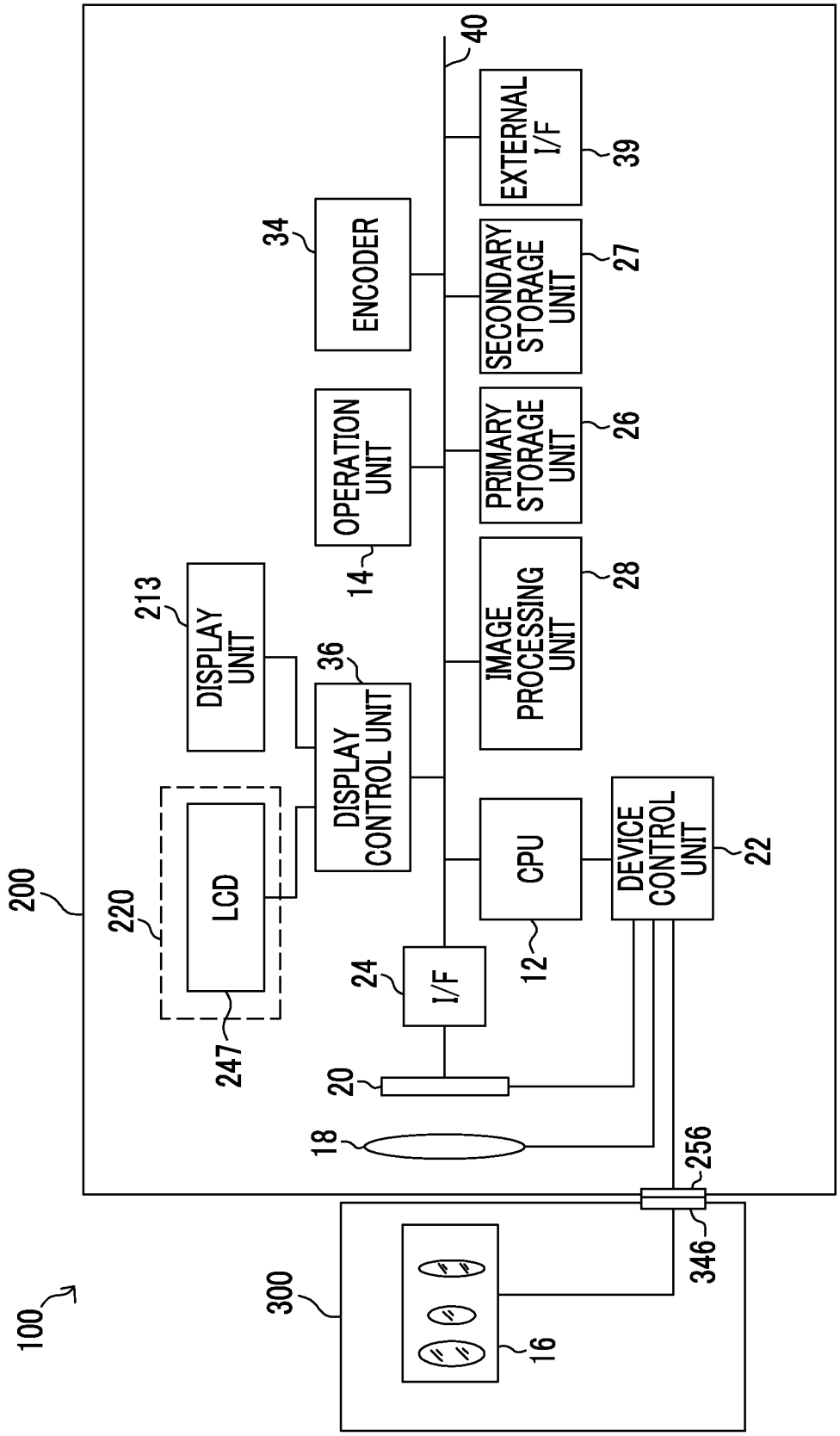
FIG. 3 is a block diagram illustrating one example of a main configuration of an electric system of the imaging apparatus according to the first embodiment.

FIG. 3 is a block diagram illustrating one example of a main configuration of an electric system of the imaging apparatus 100 according to the first embodiment.

The imaging apparatus 100 is a digital camera that records a captured still image and a motion image, and an operation of the entire camera is managed and controlled by the CPU 12. The imaging apparatus 100 includes, in addition to the CPU 12, an operation unit 14, an I/F unit 24, a primary storage unit 26, a secondary storage unit 27, an encoder 34, a display control unit 36, and an external I/F 39. In addition, the imaging apparatus 100 includes an image processing unit 28. The CPU 12 and the display control unit 36 are one example of a "control unit" according to the embodiment of the technology of the present disclosure. The CPU 12 performs a control for displaying, on the display unit 213, an image based on corrected image data output by the display control unit 36. The operation unit 14 is one example of a "reception unit" according to the embodiment of the technology of the present disclosure. The reception unit receives an instruction to cause the imaging element to start imaging from a user.

While the display control unit 36 is disposed as a hardware configuration separated from the image processing unit 28 in the first embodiment, the present disclosure is not limited thereto, and the image processing unit 28 may have the same function as the display control unit 36. In this case, the display control unit 36 is not necessary. The CPU 12, the operation unit 14, the I/F unit 24, the primary storage unit 26, the secondary storage unit 27, the image processing unit 28, the encoder 34, the display control unit 36, and the external I/F 39 are connected to each other through a bus 40.

The primary storage unit 26 is a volatile memory used as a work area or the like at a time of executing various programs. One example of the primary storage unit 26 is a RAM. The secondary storage unit 27 is a non-volatile memory in which various programs, various parameters, and the like are prestored. One example of the secondary storage unit 27 is an EEPROM, a flash memory, or the like. The CPU 12 controls each unit by reading out various programs stored in the secondary storage unit 27 from the secondary storage unit 27, loading read various programs into the primary storage unit 26, and executing loaded various programs.

The operation unit 14 includes the release button 211, the dial 212 for selecting the imaging mode or the like, the display unit 213, the finder switching lever 214, the cross key 222, the menu key 224, and the selection button 225. In addition, the operation unit 14 includes a touch panel that receives various information. For example, this touch panel is overlaid on a display screen of the display unit 213. Various operation signals output from the operation unit 14 are input into the CPU 12.

The image processing unit 28 includes a white balance gain unit and a gamma correction unit (not illustrated) and sequentially performs, by each processing unit, signal processing on a RAW image that is an original digital signal temporarily stored in the primary storage unit 26. That is, the white balance gain unit executes white balance by adjusting gains of R, G, and B signals. The gamma correction unit performs gamma correction on each of the R, G, and B signals on which WB is executed by the WB gain unit.

The encoder 34 converts an input signal into a signal in a different format and outputs the signal. The hybrid finder 220 includes an LCD 247 that displays an electronic image. The display control unit 36 is connected to each of the display unit 213 and the LCD 247. An image is displayed by the LCD 247 or the display unit 213 by selectively controlling the LCD 247 and the display unit 213. In the present embodiment, the display control unit 36 is one example of an "output unit" according to the embodiment of the technology of the present disclosure and outputs various images to the display unit 213 or the LCD 247. Hereinafter, the display unit 213 and the LCD 247 will be referred to as a "display apparatus" unless otherwise necessary to distinguish therebetween.

The external I/F 39 is connected to a communication network such as a LAN and/or the Internet and transmits and receives various information between the CPU 12 and an external apparatus such as a server, a personal computer, and/or a printer through the communication network. Accordingly, in a case where a printer is connected as the external apparatus, the imaging apparatus 100 can print the captured still image by outputting the still image to the printer. In a case where a display is connected as the external apparatus, the imaging apparatus 100 can display the captured still image and/or the live view image by outputting the still image and/or the live view image to the display.

Image light showing the subject is formed on a light receiving surface of the imaging element 20 through the imaging lens 16 and a shutter 18. The imaging element 20 has a so-called electronic shutter function and controls an electric charge accumulation time period, that is, an exposure time period, of each photoelectric conversion element 51 by performing the electronic shutter function. While a CMOS sensor is employed as one example of the imaging element 20 in the present embodiment, the present disclosure is not limited thereto, and any imaging element that can implement reading using a global shutter method and a rolling method described later may be used.

The imaging element 20 is a CMOS sensor in which a plurality of photoelectric conversion elements 51 are two-dimensionally arranged in a horizontal direction and a vertical direction. Hereinafter, for convenience of description, the horizontal direction will be referred to as a row direction, and the vertical direction will be referred to as a column direction.

Figure 4:
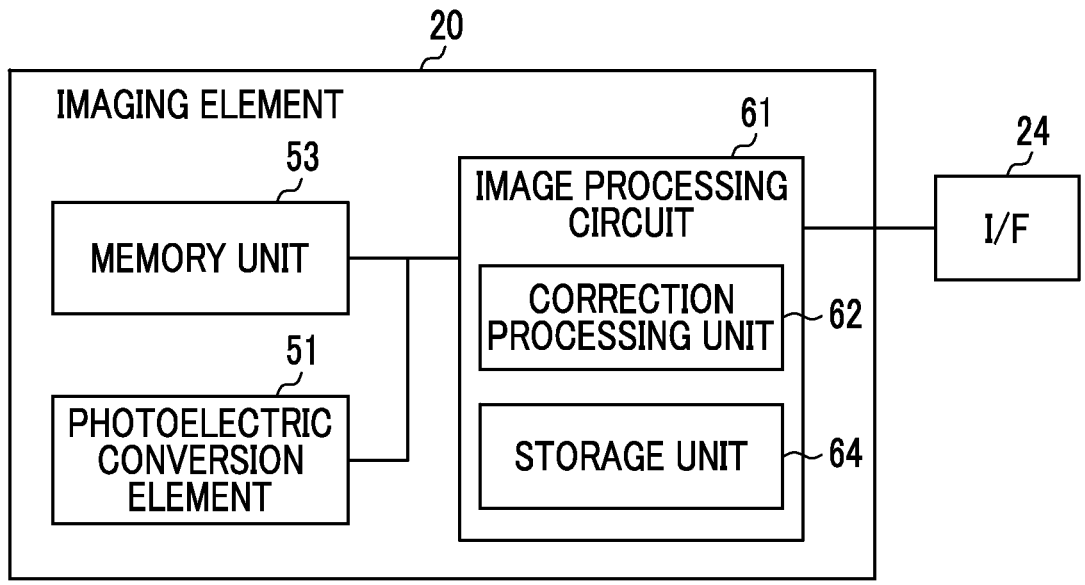
FIG. 4 is a block diagram illustrating one example of a main configuration of an imaging element according to the first embodiment.

For example, as illustrated in FIG. 4, the imaging element 20 includes the photoelectric conversion element 51, a memory unit 53, and an image processing circuit 61. The photoelectric conversion element 51 generates image data indicating the subject by imaging the subject in accordance with an instruction received by operating the release button 211. The image data generated by the photoelectric conversion element 51 is one example of "captured image data" according to the embodiment of the technology of the present disclosure. The memory unit 53 stores the image data that has characteristics that optical noise is superimposed, and is transferred from the photoelectric conversion element 51. The imaging element 20 is connected to the bus 40 through the I/F unit 24.

The image processing circuit 61 is one example of a "reading unit" according to the embodiment of the technology of the present disclosure and reads out the image data from the memory unit 53. The image processing circuit 61 reads out the image data transferred to the memory unit 53 as region image data for each of a plurality of regions divided into the memory unit 53. After reading for each region image data is finished, the image processing circuit 61 reads out data of a predetermined region again. Hereinafter, for convenience of description, the plurality of regions divided in the memory unit 53 will be simply referred to as the "plurality of regions". Here, the "predetermined region" refers to a region of the memory unit 53 from which the image data is read out first as the region image data. The predetermined region is affected by the optical noise and accumulates data caused by the optical noise. Hereinafter, for convenience of description, the "data of the predetermined region" will be referred to as "optical noise data". While PLS is assumed as the optical noise in the present embodiment, PLS is merely one example, and the optical noise may be of other types.

The image processing circuit 61 includes a correction processing unit 62 and a storage unit 64. The correction processing unit 62 reads out, from the memory unit 53, the image data stored in the memory unit 53 and temporarily stores the read image data in the storage unit 64. The correction processing unit 62 generates corrected image data by correcting the image data stored in the storage unit 64 for each of the plurality of regions in accordance with the optical noise decided in accordance with the optical noise data. The corrected image data is an image in which an effect of the optical noise is suppressed compared to the image data stored in the storage unit 64.

The image processing circuit 61 may be an ASIC that is an integrated circuit in which circuits of a plurality of functions related to image processing are combined into one circuit. Alternatively, for example, the image processing circuit 61 may be another hardware configuration such as a computer including a CPU, a ROM, and a RAM, an FPGA, or a PLD. Alternatively, for example, the image processing circuit 61 may be a combination of two or more types of hardware configurations of an ASIC, an FPGA, a PLD, a computer, and the like.

Figure 5:
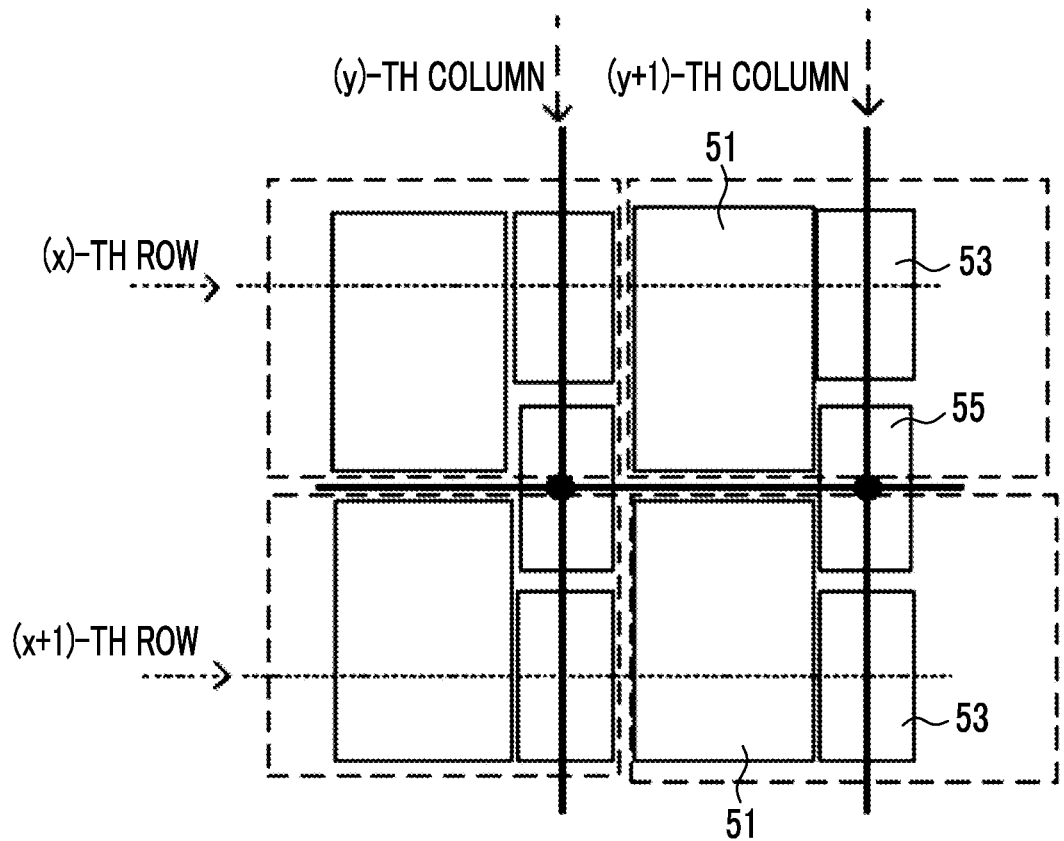
FIG. 5 is an enlarged partial plan view of the imaging element according to the first embodiment.

For example, as illustrated in FIG. 5, multiple units, surrounded by a broken line, each including the photoelectric conversion element 51, the memory unit 53, and a floating diffusion unit 55 are arranged in the row direction in the imaging element 20. In the present embodiment, one column in the horizontal direction is referred to as a row. One column in the vertical direction is referred to as a column. For example, in a case where one row on an upper side of FIG. 5 is denoted by an (x)-th row, a row on a lower side is an (x+1)-th row. In a case where a column on a left side of the drawing is denoted by a (y)-th column, a column on a right side is a (y+1)-th column. While the memory unit 53 is disposed adjacent to the photoelectric conversion element 51 in the horizontal direction in the example illustrated in FIG. 5, a positional relationship between the memory unit 53 and the photoelectric conversion element 51 is not limited thereto. For example, the memory unit 53 may be arranged above or below the photoelectric conversion element 51. Alternatively, for example, the memory unit 53 may be arranged to be overlaid on the photoelectric conversion element 51.

In a case where the user pushes the release button 211 of the imaging apparatus 100, all pixels of the photoelectric conversion element 51 are reset. Next, the photoelectric conversion element 51 operates for the set electric charge accumulation time period and converts light into signal electric charges. In a case where exposure is finished, the signal electric charges generated during the exposure are transferred to the memory unit 53 using the so-called global shutter method. That is, for example, the signal electric charges of all effective pixels accumulated in the photoelectric conversion element 51 are transferred to the memory unit 53 at the same time in synchronization with a transfer signal. Here, the "signal electric charges" refer to electric charges generated by imaging the subject. The signal electric charges correspond to the image data indicating the subject. While the global shutter method is illustrated here, a rolling shutter method can be applied.

The signal electric charges temporarily stored in the memory unit 53 are sequentially read out as a digital signal corresponding to the signal electric charges from the floating diffusion unit 55 using a reading signal input from the image processing circuit 61. A method of sequentially reading out the signal electric charges is referred to as the so-called rolling method. For example, in the configuration illustrated in FIG. 5, signal electric charges from each of two adjacent rows of the memory unit 53 are read out from one floating diffusion unit 55.

For example, reading is performed by reading for each row using the rolling method. Thus, it takes a certain time period to read out all signal electric charges of the memory unit 53. Meanwhile, noise electric charges generated in the photoelectric conversion element 51 and/or the memory unit 53 due to stray light or the like are superimposed on the signal electric charges. For example, in a case where the memory unit 53 not including a light blocking member is exposed to extraneous light, the optical noise from the memory unit 53 is superimposed on the signal electric charges. Thus, the image data stored and read out from the memory unit 53 is captured image data in which the optical noise is superimposed on the image data obtained by imaging the subject. Hereinafter, for convenience of description, an image before correction on which the optical noise is superimposed will be referred to as a captured image. In the present embodiment, processing illustrated below is performed in order to remove the superimposed optical noise from the captured image.

Figure 6A:
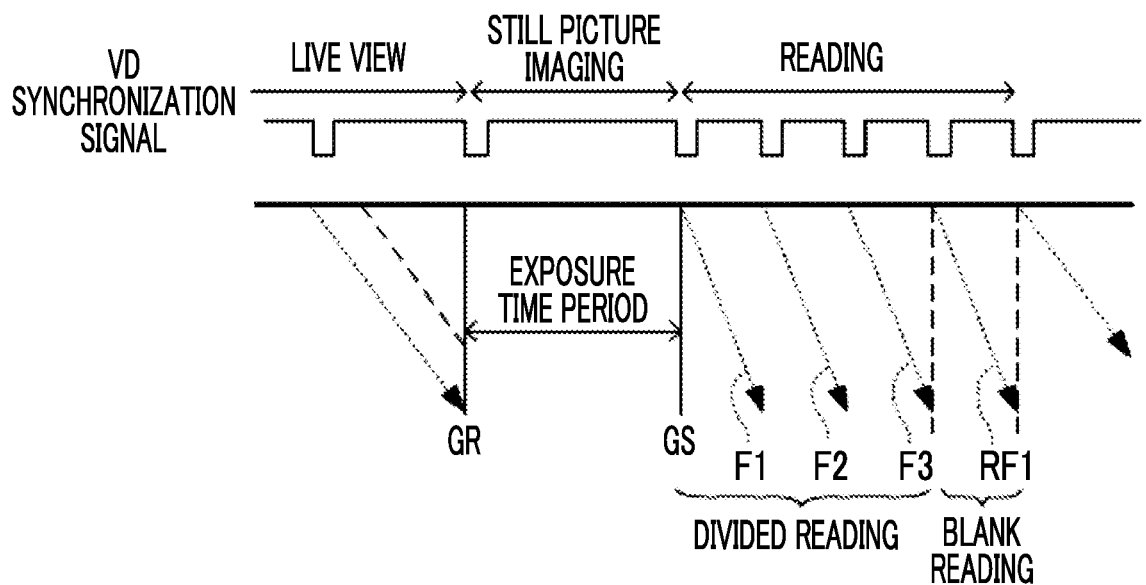
FIGS. 6A and 6B are time charts for reading out image data from a memory unit.
Figure 6B:
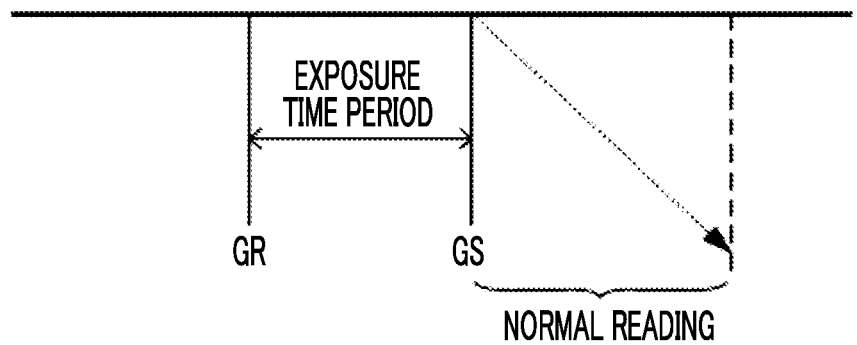

FIGS. 6A and 6B are one example of a time chart (horizontal axis denotes time) for reading out the image data that is accumulated in the exposure time period and stored in the memory unit 53. In the present embodiment, for example, as illustrated in FIG. 6A, the image processing circuit 61 reads out the image data accumulated in the memory unit 53 in a predetermined order for each region of three regions divided in the memory unit 53. Here, "three regions" are one example of the "plurality of regions".

In the present embodiment, for example, as illustrated by "F1" in FIG. 6A, the image processing circuit 61 reads out image data of a first region first using the rolling method. Next, for example, as illustrated by "F2" in FIG. 6A, the image processing circuit 61 reads out image data of a second region using the rolling method. Next, for example, as illustrated by "F3" in FIG. 6A, the image processing circuit 61 reads out image data of a third region using the rolling method. Finally, for example, as illustrated by "RF1" in FIG. 6A, the image processing circuit 61 again reads out the first region that has been read out first.

In a case of reading out the first region again, the image processing circuit 61 does not read out signal electric charges of an imaging target generated by the photoelectric conversion element 51 and reads out the optical noise data corresponding to an optical noise component that is generated in the first region after the first region has been read out first. Hereinafter, reading out a once read region again by the image processing circuit 61 will be referred to as "blank reading".

A reading order of each region is not particularly limited but is preferably decided in association with a method of dividing the regions described later. The region subjected to the blank reading is preferably a region in which reading is performed first. A reason will be described later.

FIG. 6B is a time chart illustrating a method of reading in the related art using a sequential rolling method from the first row to the last row without dividing the memory unit 53. This method of reading will be referred to as normal reading.

In the present embodiment, depending on an imaging condition, the image processing circuit 61 can separately use a divided reading method of reading out the image data by dividing the image data and a normal reading method of sequentially reading out the image data without dividing the image data.

A method of dividing the regions in the memory unit 53 will be described. The imaging element 20 is divided in advance into a plurality of regions in accordance with color division of the pixels. The regions are divided such that the signal electric charges accumulated in the memory unit 53 are equally divided. More specifically, the pixels of the photoelectric conversion element 51 corresponding to a storage element included in each region are divided so as to be evenly distributed in an imaging region. A storage element of the memory unit 53 is disposed adjacent to each pixel of the photoelectric conversion element 51. Thus, equally dividing the pixels of the photoelectric conversion element 51 means that the memory unit 53 is equally divided. By such dividing, the entire captured image is equally divided into the region image data which is image data of each region.

FIG. 7 illustrates one example of a method of dividing the regions. In the example illustrated in FIG. 7, 4896 pixels in the row direction and 3264 pixels in the column direction are arranged in the imaging element 20, and the number of pixels of (4896×3264) and an aspect ratio of 3:2 are employed. However, the number of pixels and the aspect ratio are not limited thereto.

In the present embodiment, for example, as illustrated in FIG. 7, pixels arranged using a matrix manner are allocated to one region by periodically thinning out in units of rows. Specifically, the pixels are allocated to one region by thinning out the entire one row in units of three rows. That is, pixels in the first row, pixels in the second row, and pixels in the third row are allocated to the first region, the second region, and the third region, respectively. In the present specification, thinning out means taking out a part. Hereinafter, the "region" will be referred to as a "field".

The same applies from the fourth row. Pixels in the fourth row, pixels in the fifth row, and pixels in the sixth row are allocated to the first field, the second field, and the third field in this order. That is, pixels of a row for which a remainder of a row number divided by three which is the number of fields is one are allocated to the first field. Pixels of a row for which the remainder is two are allocated to the second field. Pixels of a row for which the row number is completely divided by three are allocated to the third field. Such allocation is performed for the pixels of all rows. Division into the plurality of regions by allocating the pixels of the imaging element 20 to one region by periodically thinning out in units of rows will be referred to as "field division".

For example, as illustrated in FIG. 7, the imaging element 20 has sensitivity to each of a plurality of predetermined primary colors. That is, the imaging element 20 can perform color imaging. In the present embodiment, a color filter of three colors of red (R), green (G), or blue (B) is arranged on each photoelectric conversion element 51. Methods of arranging the color filters include Bayer arrangement, WRGB arrangement, clear bit arrangement, or the like.

In the present embodiment, arrangement of the color filters of the imaging element 20 is maintained as arrangement of color filters appropriate for each field even in a case where the field division is performed for each row. Specifically, an R filter and a G filter are alternately arranged in the first row like the R filter, the G filter, the R filter, and the G filter. The G filter and a B filter are alternately arranged in the second row like the G filter, the B filter, the G filter, and the B filter. Hereinafter, odd-numbered rows will have the same arrangement as the first row, and even-numbered rows will have the same arrangement as the second row.

In a case where the pixels after color division are subjected to the field division using the method illustrated in FIG. 7, the first field to the third field have arrangement illustrated in FIG. 8A to FIG. 8C. Pixels of 1088 rows×1632 columns are arranged in each field. In addition, as illustrated in FIG. 8A to FIG. 8C, the first field to the third field have the same arrangement of three colors, and this arrangement is the same as arrangement of all regions before division. Arranging all pixels as illustrated in FIG. 7 results in the same arrangement of each field after division. Thus, detection accuracy of the optical noise in a case where field division reading is performed is increased. A method of color division is not limited to a method using the color filters and may be, for example, a method using a prism, a method of laminating with a photodiode, or a method of laminating with an organic photoelectric film.

As described above, one row in which the photoelectric conversion element 51 having sensitivity to each of the plurality of primary colors has predetermined arrangement is a unit of groups. Since all rows are periodically thinned out to the same region, each region includes the pixels of the photoelectric conversion elements 51 obtained by equally dividing the pixels of all photoelectric conversion elements 51 into three parts. While the memory unit 53 is divided into three regions in the present embodiment, the number of regions to be divided is not limited thereto and may be any number. In the method of dividing, in a case of dividing into X parts, pixels of a row for which the remainder of the row number divided by X is one are allocated to the first field. Pixels of a row for which the remainder is two are allocated to the second field. Pixels of a row for which the row number is completely divided are allocated to an X-th field.

Division of the regions is not limited to the above method, provided that each region can be divided such that all signal electric charges accumulated in the memory unit 53 are equally divided. For example, pixels of one row may be allocated to a plurality of regions. Alternatively, a plurality of rows may be collectively allocated to one region.

Next, one example of a method of removing the optical noise by the imaging apparatus 100 according to the embodiment of the technology of the present disclosure will be described with reference to FIG. 9 to FIG. 13.

In the method of removing the optical noise, first, a comparison result between fields is acquired. In the present embodiment, the comparison result is a difference between image data of each of a pair of adjacent region image data. The fields as targets for acquiring the difference are a pair of fields adjacent in the reading order. The region image data is corrected based on the comparison result between a pair of region image data adjacent in the reading order of the correction processing unit 62. As described above, the correction processing unit 62 reads out the first field first and then, reads out the second field and the third field in this order. Accordingly, the correction processing unit 62 calculates a difference between the first field and the second field. Furthermore, the correction processing unit 62 calculates a difference between the second field and the third field. In a case where the number of fields is three, processing of acquiring the difference is finished as described so far. In a case where the number of fields is greater than or equal to four, the correction processing unit 62 acquires the difference in the same manner up to the last field.

Figure 9:
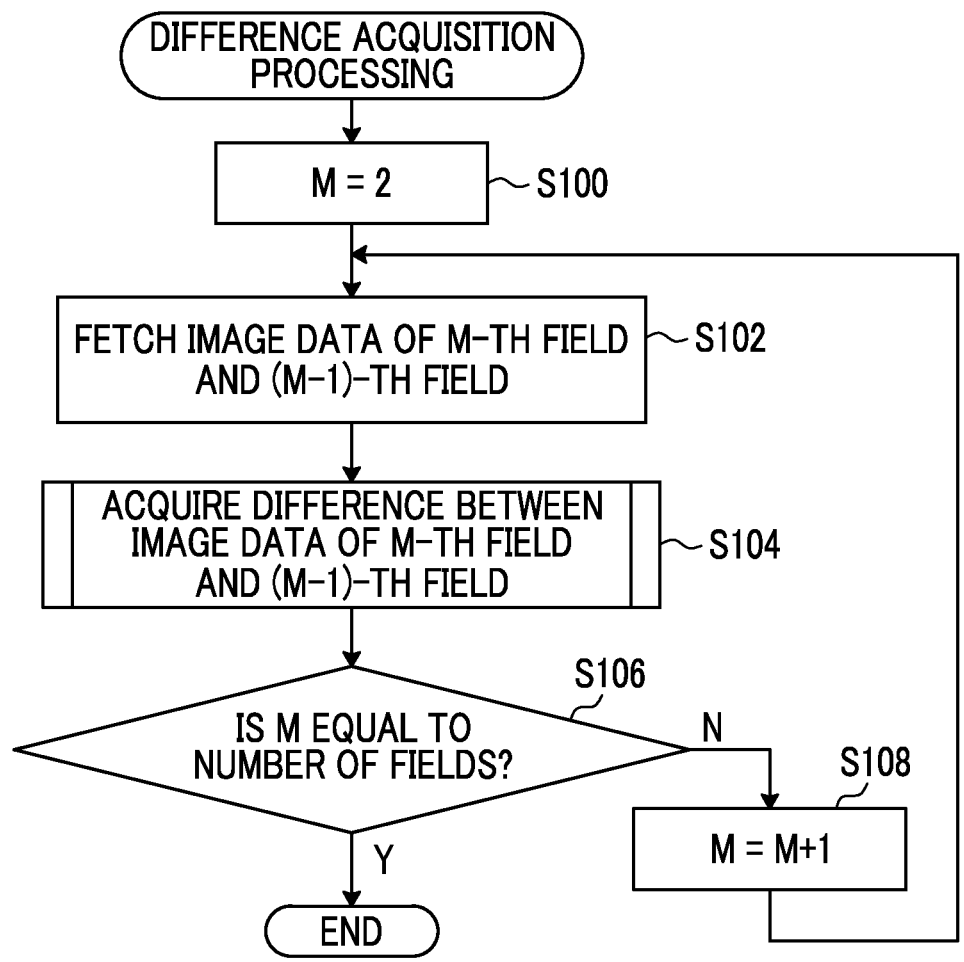
FIG. 9 is a flowchart illustrating one example of a flow of difference acquisition processing according to the first embodiment.

For example, in difference acquisition processing illustrated in FIG. 9, first, in step S100, an initial value of 2 is stored in a number-of-fields register M. In subsequent step S102, the correction processing unit 62 reads out image data of each of an M-th field and an (M−1)-th field.

Hereinafter, for convenience of description, image data of each field will be referred to as "field image data" or simply the "image data". The field image data is a collection of data of each pixel that is read out from the memory unit 53 and stored in the storage unit 64. As described above, pixels of 1088 rows×1632 columns are arranged in each field. A row number will be denoted by x, and a column number will be denoted by y. Pixels of the x-th row and the y-th column will be denoted by [x, y]. Pixel data at [x, y] of image data of the M-th field will be referred to as ImageM[x, y]. Pixel data at coordinates [x, y] of image data of the (M−1)-th field will be referred to as Image(M−1)[x, y]. Here, x is 1 to 1088, and y is 1 to 1632.

In subsequent step S104, the correction processing unit 62 acquires a difference obtained by subtracting the image data of the (M−1)-th field from the image data of the M-th field. The difference is obtained by subtracting image data of a field that is earlier in the reading order, from image data of a field that is later in the reading order. That is, the difference is obtained by subtracting data of each field at the same coordinates [x, y].

Figure 10:
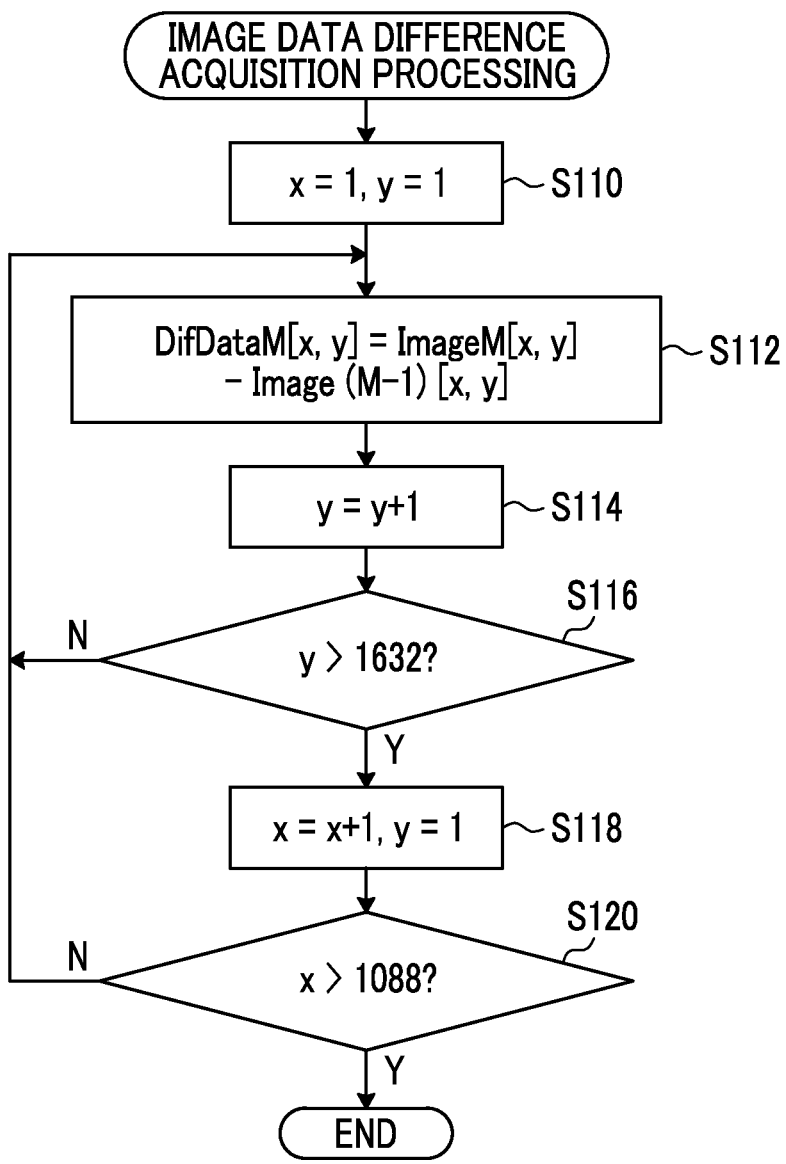
FIG. 10 is a flowchart illustrating one example of a flow of image data difference acquisition processing according to the first embodiment.

Processing of step S104 will be described in detail using FIG. 10. For example, in image data difference acquisition processing illustrated in FIG. 10, first, in step S110, x=1 and y=1 are stored in a coordinate register as the processing coordinates [x, y] of the M-th field and the (M−1)-th field. Next, in step S112, DifDataM[1, 1] obtained by subtracting pixel data of the (M−1)-th field at coordinates [1, 1] from pixel data of the M-th field at the coordinates [1, 1] is stored in the storage unit 64. DifDataM[1, 1] is a difference between the M-th field and the (M−1)-th field at the coordinates [1, 1].

In subsequent step S114, the correction processing unit 62 increments the y coordinate of the coordinate register by one and then, transitions to step S116.

In step S116, the correction processing unit 62 determines whether or not a value of y exceeds 1632. In step S116, in a case where the value of y is less than or equal to 1632, a negative determination is made, and the image data difference acquisition processing returns to step S112. In step S116, in a case where the value of y exceeds 1632, a positive determination is made, and the image data difference acquisition processing transitions to step S118.

In step S118, the correction processing unit 62 increments a value of x of the coordinate register by one and returns the value of y to one.

In subsequent step S120, the correction processing unit 62 determines whether or not the value of x exceeds 1088. In step S120, in a case where the value of x is less than or equal to 1088, a negative determination is made, and the image data difference acquisition processing returns to step S112. In step S120, in a case where the value of x exceeds 1088, a positive determination is made, and the correction processing unit 62 finishes the image data difference acquisition processing.

While the difference is acquired for each corresponding pixel in the above processing, for example, the difference may be collectively acquired for each corresponding row.

The correction processing unit 62 obtains the difference for each pixel by executing the image data difference acquisition processing. Obtained difference data is stored in the storage unit 64. The differences of all pixels will be referred to as difference data DifDataM[x, y] of the M-th field. Image difference data of the M-th field is used for correcting the image data of the M-th field.

Returning to FIG. 9, in step S106, the correction processing unit 62 determines whether or not M is equal to the number of fields. In step S106, in a case where M is different from the number of fields, a negative determination is made, and the difference acquisition processing transitions to step S108. In step S108, the correction processing unit 62 increments M by one, and the difference acquisition processing returns to step S102. In step S106, in a case where M is equal to the number of fields, a positive determination is made, and the correction processing unit 62 finishes the difference acquisition processing. The correction processing unit 62 obtains (M−1) pieces of image difference data from the second field to the M-th field by executing the above difference acquisition processing.

Next, the correction processing unit 62 performs noise position decision processing of deciding a pixel position having the optical noise. The noise position decision processing refers to processing of deciding a noise position by determining whether or not the difference data for each coordinate is noise in each field.

Figure 11:
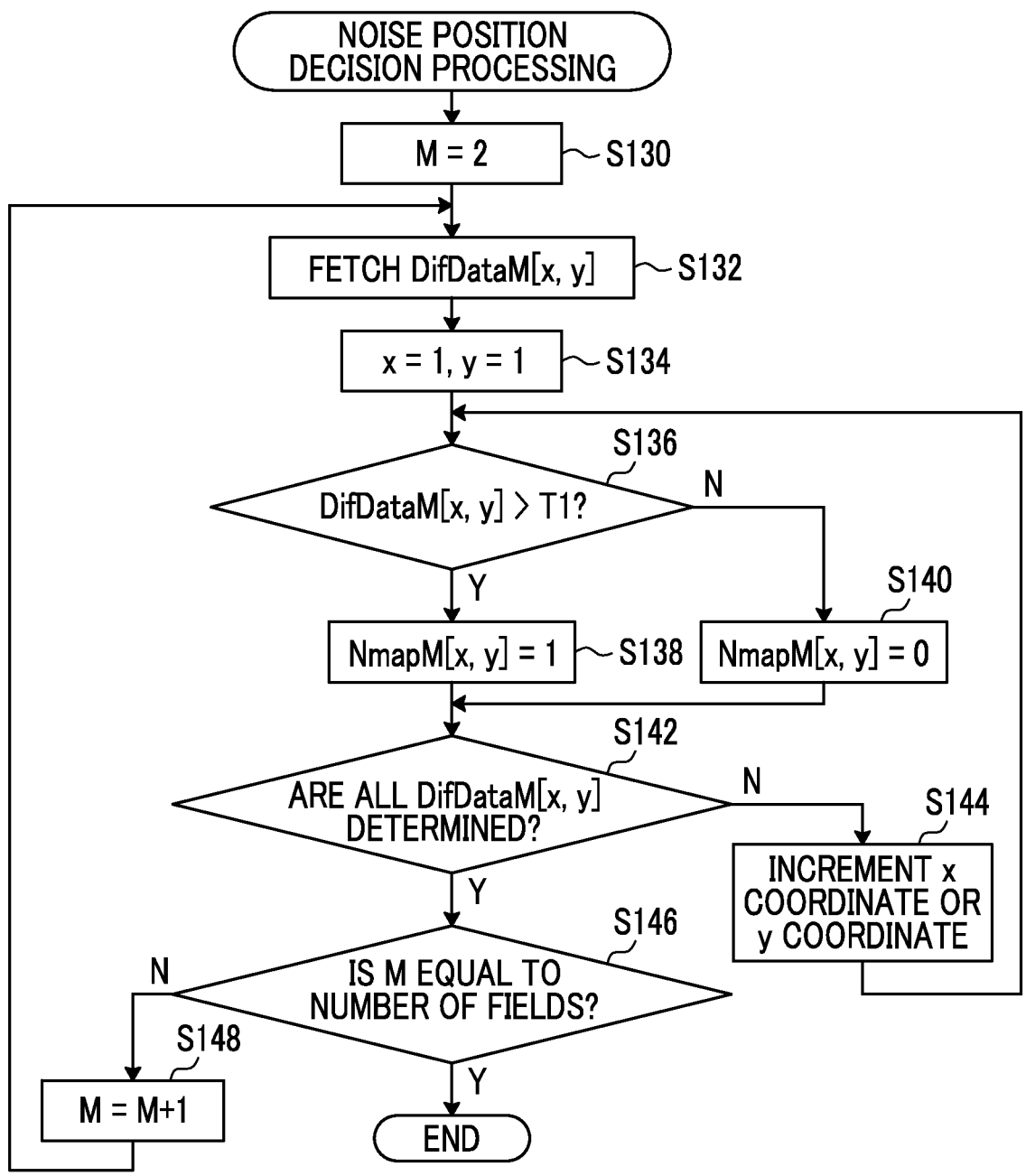
FIG. 11 is a flowchart illustrating one example of a flow of noise position decision processing according to the first embodiment.

For example, in the noise position decision processing illustrated in FIG. 11, first, in step S130, an initial value of 2 is stored in the number-of-fields register M.

In subsequent step S132, the correction processing unit 62 fetches the difference data DifDataM[x, y] of the second field from the storage unit 64. In subsequent step S134, x=1 and y=1 are stored in the coordinate register as coordinate data.

In subsequent step S136, the correction processing unit 62 determines whether or not DifDataM[1, 1] is greater than a predetermined threshold value T1. For example, the threshold value T1 refers to a value that is obtained in advance by test using an actual apparatus and/or computer simulation, as a data amount of the optical noise data of one pixel obtained by the optical noise superimposed on the signal electric charges of one pixel accumulated in the memory unit 53.

In step S136, in a case where DifDataM[1, 1] is greater than the predetermined threshold value T1, a positive determination is made, and the noise position decision processing transitions to step S138. In step S136, in a case where DifDataM[1, 1] is less than or equal to the predetermined threshold value T1, a negative determination is made, and the noise position decision processing transitions to step S140.

In step S138, the correction processing unit 62 assigns, to a noise map NmapM[1, 1], "1" that is a value indicating that the optical noise is present, and then, the noise position decision processing transitions to step S142.

In step S140, the correction processing unit 62 assigns, to the noise map NmapM[1, 1], "0" that is a value indicating that the optical noise is not present, and then, the noise position decision processing transitions to step S142.

In subsequent step S142, the correction processing unit 62 determines whether or not all difference data DifDataM[x, y] of the M-th field are determined. In step S142, in a case where all difference data DifDataM[x, y] of the M-th field are not determined, a negative determination is made, and the noise position decision processing transitions to step S144. In step S142, in a case where all difference data DifDataM[x, y] of the M-th field are determined, a positive determination is made, and the noise position decision processing transitions to step S146.

In step S144, the correction processing unit 62 increments the x coordinate or the y coordinate by one, and then, the noise position decision processing returns to step S136. A procedure of incrementing the coordinate is based on the method illustrated in FIG. 10 and thus, will not be described in detail.

In step S146, the correction processing unit 62 determines whether or not M is equal to the number of fields. In step S146, in a case where M is different from the number of fields, a negative determination is made, and the noise position decision processing transitions to step S148.

In step S148, the correction processing unit 62 increments a value of M by one, and then, the noise position decision processing returns to step S132. The correction processing unit 62 sequentially executes processing on an (M+1)-th field that is a subsequent field from step S132.

In step S146, in a case where M is equal to the number of fields, a positive determination is made, and the correction processing unit 62 finishes the noise position decision processing.

As described above, a pixel position having the optical noise in a field that is later in the reading order is decided from a difference between image data of two fields adjacent in the reading order.

By the noise position decision processing, a noise map NmapM[x, y] in which a coordinate position of the noise is decided is obtained for each field. By executing processing of step S138 or processing of step S140, binary data of "1" or "0" is assigned to coordinates of the noise map. A reason for binarizing the coordinates of the noise map is that the amount of the optical noise is smaller than the signal electric charges of the subject. Thus, in a case where a difference between adjacent fields is acquired, there is a possibility that the obtained optical noise is mixed with the signal electric charges of the subject which is a background, and increases error. Therefore, the noise map is used for determining whether or not the optical noise occurs, that is, determining an occurring position of the optical noise.

Figure 12:
FIG. 12 is a noise map diagram illustrating one example of a distribution state of a captured image obtained by imaging performed by the imaging apparatus according to the first embodiment.

FIG. 12 is one example of a noise map diagram in which a part of the binary data of "1" assigned to the noise map is illustrated in white and a part of the binary data of "0" assigned to the noise map is illustrated in black. In the example illustrated in FIG. 12, a white part indicates a position at which the optical noise occurs.

Next, the correction processing unit 62 performs field image correction processing. The field image correction processing refers to processing of correcting the image data of each field using the noise map NmapM[x, y].

Figure 13:
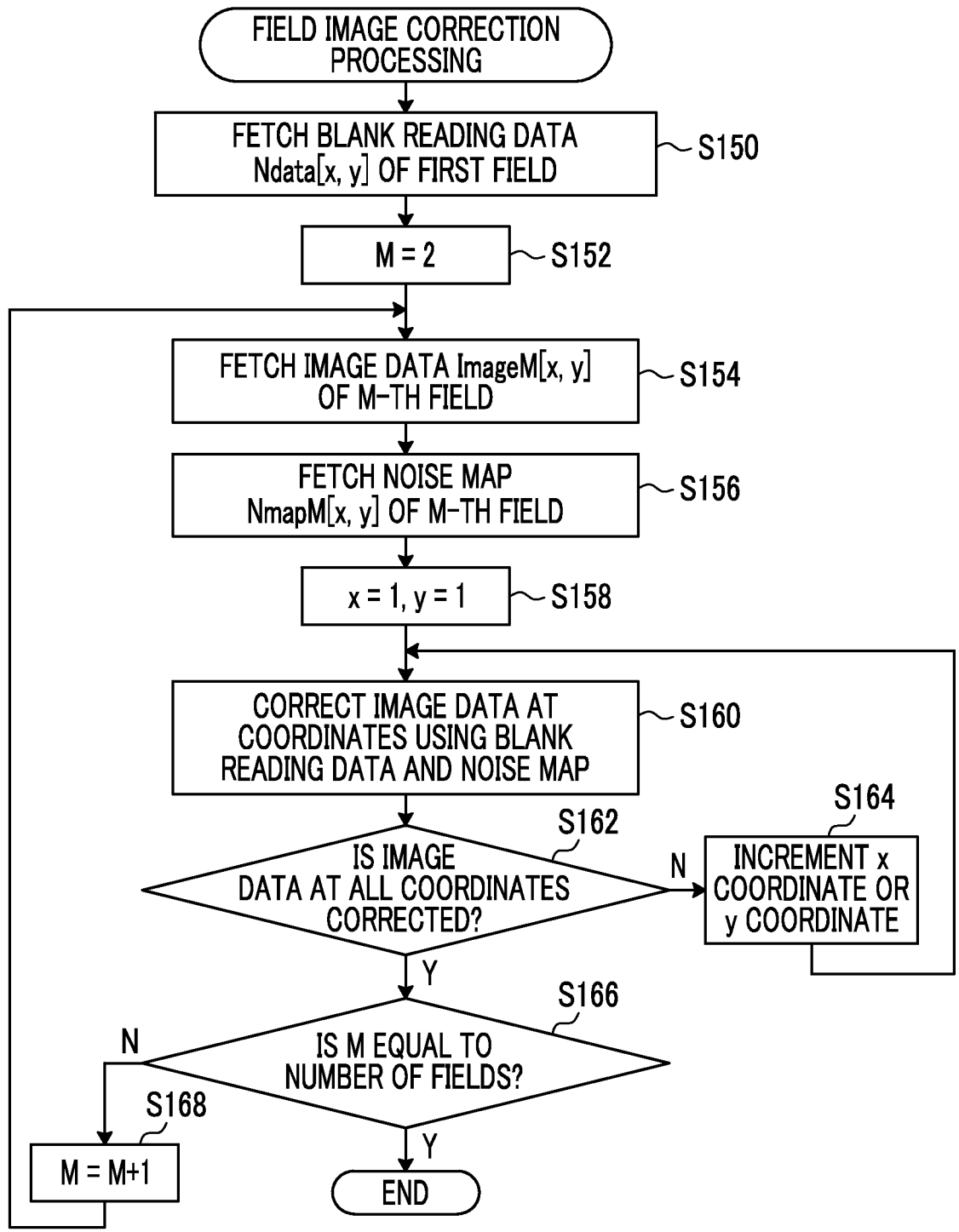
FIG. 13 is a flowchart illustrating one example of a flow of field image correction processing according to the first embodiment.

For example, in the field image correction processing illustrated in FIG. 13, first, in step S150, the correction processing unit 62 fetches blank reading data Ndata[x, y] of the first field in the storage unit 64.

In subsequent step S152, an initial value of 2 is stored in the number-of-fields register M. In subsequent step S154, the correction processing unit 62 fetches the image data ImageM[x, y] of the M-th field in the storage unit 64. In subsequent step S156, the correction processing unit 62 fetches the noise map NmapM[x, y] of the M-th field in the storage unit 64. In subsequent step S158, x=1 and y=1 are stored in the coordinate register as the coordinate data.

In subsequent step S160, the correction processing unit 62 corrects the image data ImageM[x, y] of processing coordinates using the blank reading data Ndata[x, y] and the noise map NmapM[x, y]. Specifically, a product of the blank reading data and the noise map is subtracted from the image data for each processing coordinate. That is, in a case where image data after correction is denoted by CImageM[x, y], "CImageM[x, y]=ImageM[x, y]−Ndata[x, y]×NmapM[x, y]" is represented.

Data of the noise map NmapM[x, y] indicates the coordinate position at which the optical noise occurs. That is, data at the occurring position is "1", and data at a non-occurring position is "0". Meanwhile, only the occurring optical noise is read out in the blank reading data. Thus, accuracy of a numerical value of the blank reading data is high. Therefore, a position and an occurring amount of the optical noise can be accurately decided by combining the data of the noise map with the blank reading data.

In step S162, the correction processing unit 62 determines whether or not image data of all coordinates is corrected. In step S162, in a case where the image data of all coordinates is not corrected, a negative determination is made, and the field image correction processing transitions to step S164. In step S162, in a case where the image data of all coordinates is corrected, a positive determination is made, and the field image correction processing transitions to step S166.

In step S164, the correction processing unit 62 increments the x coordinate or the y coordinate, and then, the field image correction processing transitions to step S160. A procedure of incrementing the coordinate is based on the method illustrated in FIG. 10 and thus, will not be described in detail.

In step S166, the correction processing unit 62 determines whether or not M is equal to the number of fields. In step S166, in a case where M is different from the number of fields, a negative determination is made, and the field image correction processing transitions to step S168.

In step S168, the correction processing unit 62 increments M by one and sequentially executes processing on the subsequent (M+1)-th field from step S154.

In step S166, in a case where M is equal to the number of fields, a positive determination is made, and the correction processing unit 62 finishes the field image correction processing.

By the above processing, the corrected image data from the second field to the M-th field is obtained. The correction processing unit 62 can obtain one corrected image by combining the image data of the first field, which is read out first, with the corrected image data from the second field to the M-th field.

In the present embodiment, in the pair of fields adjacent in the reading order, the photoelectric conversion elements 51 of each field are adjacent in units of rows. Since a distance between the adjacent photoelectric conversion elements 51 is significantly short, it is considered that a difference in image data of the subject accumulated in the memory units 53 of the photoelectric conversion elements 51 in the same exposure time period is significantly small. Accordingly, in a case where the difference in image data accumulated in the adjacent memory units 53 is large, it is considered that a likelihood that the difference is caused by the optical noise is high. By using this feature, the optical noise is removed by acquiring the difference between the pair of fields adjacent in the reading order, that is, present at adjacent arrangement positions, in the present embodiment.

Furthermore, in the present embodiment, the first field which is read out first is subjected to the blank reading last. By the blank reading, optical noise that occurs in the first field during reading of the second field and the third field after the first field is read out first is read out. This optical noise is optical noise actually occurring in the first field, and it is considered that the same degree of optical noise also occurs in the second field and the third field.

While a field subjected to the blank reading may not be the first field which is read out first, a time period until the blank reading is short in other fields. Thus, an actually measured amount of the optical noise is proportionally converted from a time period until the last field is read out. Thus, the field in which the region image data is read out first from the memory unit 53 is preferably subjected to the blank reading last in order to actually measure the optical noise as long as possible.

According to the first embodiment, the position at which the optical noise occurs and the amount of the optical noise can be separately accurately decided. By correcting the captured image using the decided data of the optical noise, the captured image in which the optical noise is suppressed can be obtained without changing a mechanical configuration of the imaging element or the imaging apparatus.

For example, the above embodiment can be applied to capturing of the still image. In addition, for example, in a continuous capturing mode, the above processing can be performed each time one image is captured. Alternatively, in a case where correction information that is obtained by applying the present method at a time of first capturing of one image is stored, and the captured image is corrected in subsequent imaging using the correction information, a continuously captured image having small optical noise can be obtained at a high speed.

In the first embodiment, the correction processing unit 62 integrated with the imaging element 20 performs optical noise correction processing. However, the correction processing unit 62 does not need to perform the optical noise correction processing. For example, the CPU 12 may perform the optical noise correction processing by reading out an optical noise correction program stored in the secondary storage unit 27.

Second Embodiment

Next, for example, a second embodiment will be described with reference to the flowchart illustrated in FIG. 14. Matters such as a mechanical configuration of the imaging apparatus 100 or the imaging element 20 not described below are the same as the first embodiment. In a case of performing the same processing as the first embodiment, description may be partially simplified by using the same data names. A modification example of the first embodiment can also be applied to the following embodiment.

In the imaging apparatus 100 according to the second embodiment, the noise map NmapM[x, y] is created after the image data of each field is subjected to demosaicing. In a case where the imaging element 20 can perform color imaging, demosaicing refers to processing of interpolating data of adjacent pixels of different colors for each pixel to include all colors of data. Specifically, the correction processing unit 62 generates demosaiced R, G, and B signals by performing color interpolation processing corresponding to arrangement of the color filters of the imaging element 20.

Figure 14:
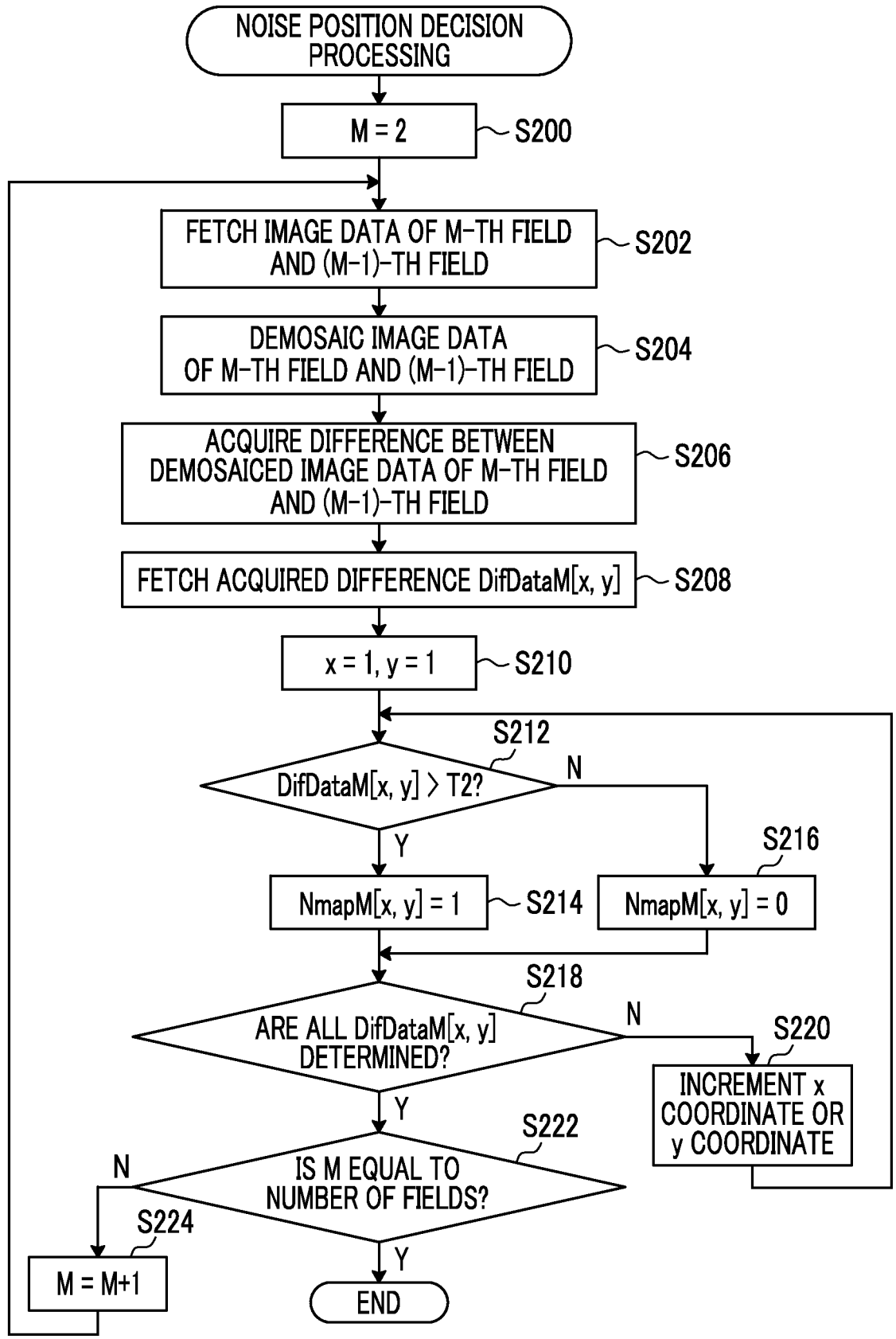
FIG. 14 is a flowchart illustrating one example of a flow of noise position decision processing according to a second embodiment.

For example, in the noise position decision processing illustrated in FIG. 14, first, in step S200, an initial value of 2 is stored in the number-of-fields register M, and then, the noise position decision processing transitions to step S202.

In step S202, the correction processing unit 62 fetches the image data of each of the M-th field and the (M−1)-th field stored in the storage unit 64, and then, the noise position decision processing transitions to step S204.

In step S204, the correction processing unit 62 demosaices each of the image data of the M-th field and the image data of the (M−1)-th field. That is, the correction processing unit 62 generates the demosaiced R, G, and B signals by performing the color interpolation processing corresponding to arrangement of the color filters for each pixel of each field.

In subsequent step S206, the correction processing unit 62 acquires the difference data DifDataM[x, y] obtained by subtracting the demosaiced image data of the (M−1)-th field from the demosaiced image data of the M-th field. The difference data DifDataM[x, y] is obtained by subtracting data at the same [x, y] coordinates of each field. A method of obtaining the difference is described using FIG. 10 and thus, will not be described in detail. The difference acquired by the correction processing unit 62 is stored in the storage unit 64.

In subsequent step S208, the correction processing unit 62 fetches the acquired difference data DifDataM[x, y], and then, the noise position decision processing transitions to step S210.

In step S210, x=1 and y=1 are stored in the coordinate register as the coordinate data, and then, the noise position decision processing transitions to step S212.

In step S212, the correction processing unit 62 determines whether or not the difference at the coordinates [1, 1] is greater than a predetermined threshold value T2. For example, the threshold value T2 refers to a value that is obtained in advance by test using an actual apparatus and/or computer simulation, as a data amount of the optical noise data of one pixel obtained by the optical noise superimposed on the signal electric charges of one pixel accumulated in the memory unit 53.

In step S212, in a case where the difference at the coordinates [1, 1] is greater than the predetermined threshold value T2, a positive determination is made, and the noise position decision processing transitions to step S214. In step S214, the correction processing unit 62 assigns, to the noise map NmapM[1, 1], "1" that is a value indicating that the optical noise is present, and then, the noise position decision processing transitions to step S218. In step S212, in a case where the difference at the coordinates [1, 1] is less than or equal to the predetermined threshold value T2, a negative determination is made, and the noise position decision processing transitions to step S216. In step S216, the correction processing unit 62 assigns, to the noise map NmapM [1, 1], "0" that is a value indicating that the optical noise is not present, and then, the noise position decision processing transitions to step S218.

In step S218, the correction processing unit 62 determines whether or not the difference is determined for all coordinates. In step S218, in a case where the difference is not determined for all coordinates, a negative determination is made, and the noise position decision processing transitions to step S220. In step S218, in a case where the difference is determined for all coordinates, a positive determination is made, and the noise position decision processing transitions to step S222.

In step S220, the correction processing unit 62 increments the x coordinate or the y coordinate, and the noise position decision processing returns to step S212.

In step S222, the correction processing unit 62 determines whether or not M is equal to the number of fields. In step S222, in a case where M is not equal to the number of fields, a negative determination is made, and the noise position decision processing transitions to step S224.

In step S224, the correction processing unit 62 increments M by one and sequentially executes processing on the subsequent (M+1)-th field from step S202.

In step S222, in a case where M is equal to the number of fields, a positive determination is made, and the correction processing unit 62 finishes the noise position decision processing.

For example, as illustrated in FIGS. 8A to 8C, all colors of R, G, and B are aligned in each field. In addition, since each field is an image obtained by periodically thinning out pixels from all pixels, subject positions vary slightly, and furthermore, pixels of the same color do not overlap. Thus, according to the imaging apparatus 100 according to the second embodiment, by comparing by demosaicing each field and interpolating each color, a comparison between the fields is easily made, and the noise map NmapM[x, y] having small error can be created.

Third Embodiment

Next, for example, a third embodiment will be described with reference to the flowchart illustrated in FIG. 15. In a case of performing the same processing as the first embodiment or the second embodiment, description may be partially simplified by using the same data names.

In the imaging apparatus 100 according to the third embodiment, the noise map NmapM[x, y] is created after low-pass filter processing is performed on the image data of each field. Hereinafter, details will be described.

Figure 15:
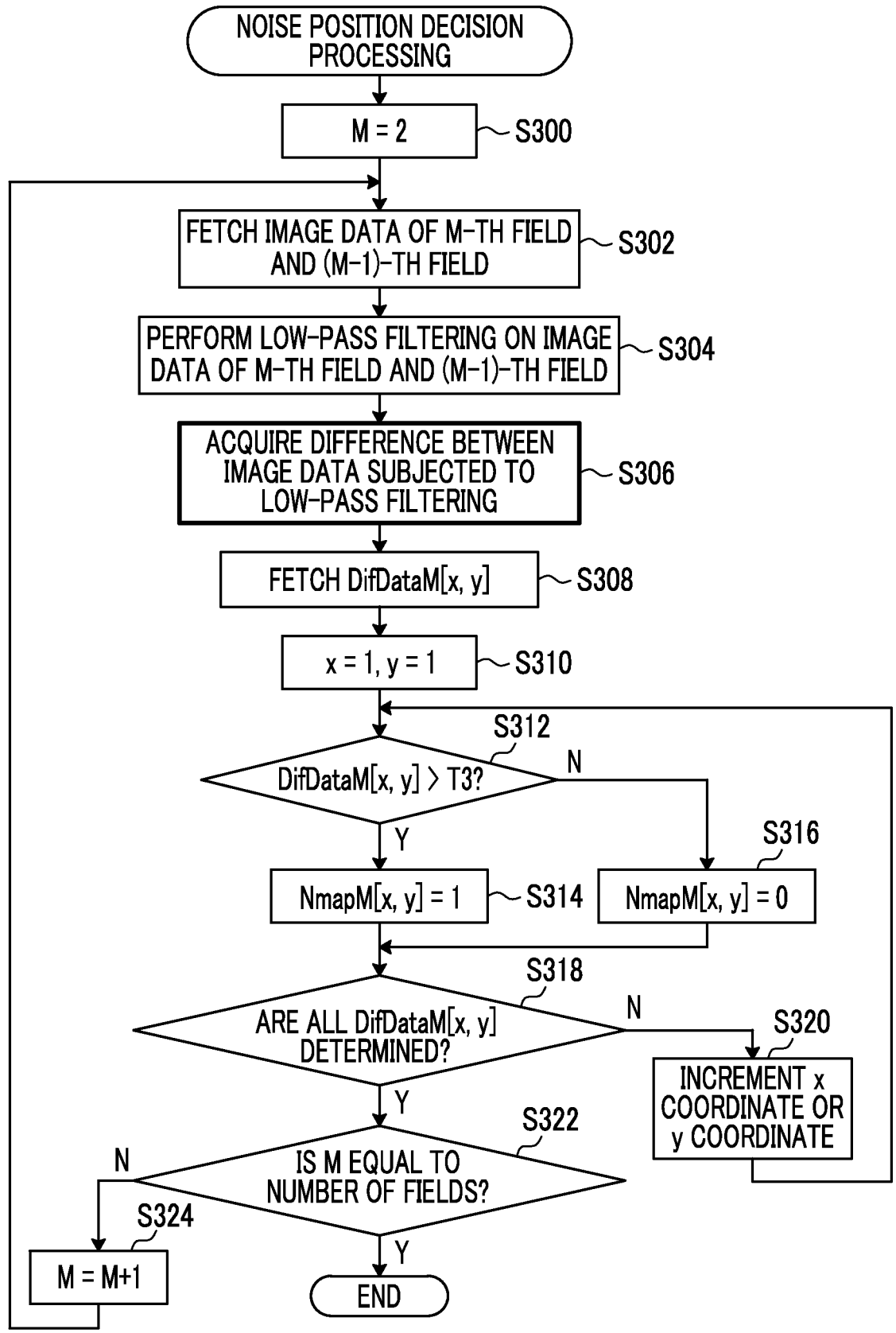
FIG. 15 is a flowchart illustrating one example of a flow of noise position decision processing according to a third embodiment.

For example, in the noise position decision processing illustrated in FIG. 15, first, in step S300, an initial value of 2 is stored in the number-of-fields register M, and then, a transition is made to step S302.

In step S302, the correction processing unit 62 fetches the image data of each of the M-th field and the (M−1)-th field stored in the storage unit 64, and then, the noise position decision processing transitions to step S304.

In step S304, the correction processing unit 62 performs the low-pass filter processing on each of the image data of the M-th field and the image data of the (M−1)-th field. That is, the correction processing unit 62 removes a high-frequency component of the pixel data.

In subsequent step S306, the correction processing unit 62 acquires the difference data DifDataM[x, y] between the image data of the M-th field subjected to the low-pass filter processing and the image data of the (M−1)-th field subjected to the low-pass filter processing. The correction processing unit 62 stores the acquired difference in the storage unit 64.

Processing from step S308 illustrated in FIG. 15 is different from processing from step S208 of the noise position decision processing illustrated in FIG. 14 in that processing of step S312 is included instead of processing of step S212. Processing of step S312 is different from processing of step S212 in that a threshold value T3 is employed instead of the threshold value T2. For example, the threshold value T3 refers to a value that is obtained in advance by test using an actual apparatus and/or computer simulation, as a data amount of the optical noise data of one pixel obtained by the optical noise superimposed on the signal electric charges of one pixel accumulated in the memory unit 53.

For example, processing from step S308 illustrated in FIG. 15 is almost the same as processing from step S208 of the noise position decision processing illustrated in FIG. 14 and thus, will be simply described below.

The correction processing unit 62 fetches the stored difference and compares the difference with the predetermined threshold value T3. The correction processing unit 62 generates a noise map by assigning "1" to the noise map NmapM[1, 1] in a case where the difference is greater than the threshold value T3, and assigning "0" to the noise map NmapM[1, 1] in a case where the difference is less than or equal to the threshold value T3.

According to the third embodiment, since each field is an image obtained by periodically thinning out the pixels, an elongated subject or a high-frequency subject such as a high-contrast subject may be captured in only one field of adjacent fields at the same coordinate position. In this case, in a case where the difference is acquired, it may be erroneously determined that the optical noise occurs at the coordinates. Even in such a case, a boundary is smoothed by applying processing of narrowing a high-frequency bandwidth using a low-pass filter or the like. Detection error can be decreased, and the noise map NmapM[x, y] having small error can be created.

Fourth Embodiment

Next, for example, a fourth embodiment will be described with reference to the flowchart illustrated in FIG. 16. In the imaging apparatus 100 according to the fourth embodiment, the noise position is decided by executing the filter processing in the same manner as the third embodiment. However, unlike the third embodiment, the filter processing is executed after the difference in image data of each field is calculated. In the following description, in a case of performing the same processing as the third embodiment, description may be partially simplified by using the same data names.

Figure 16:
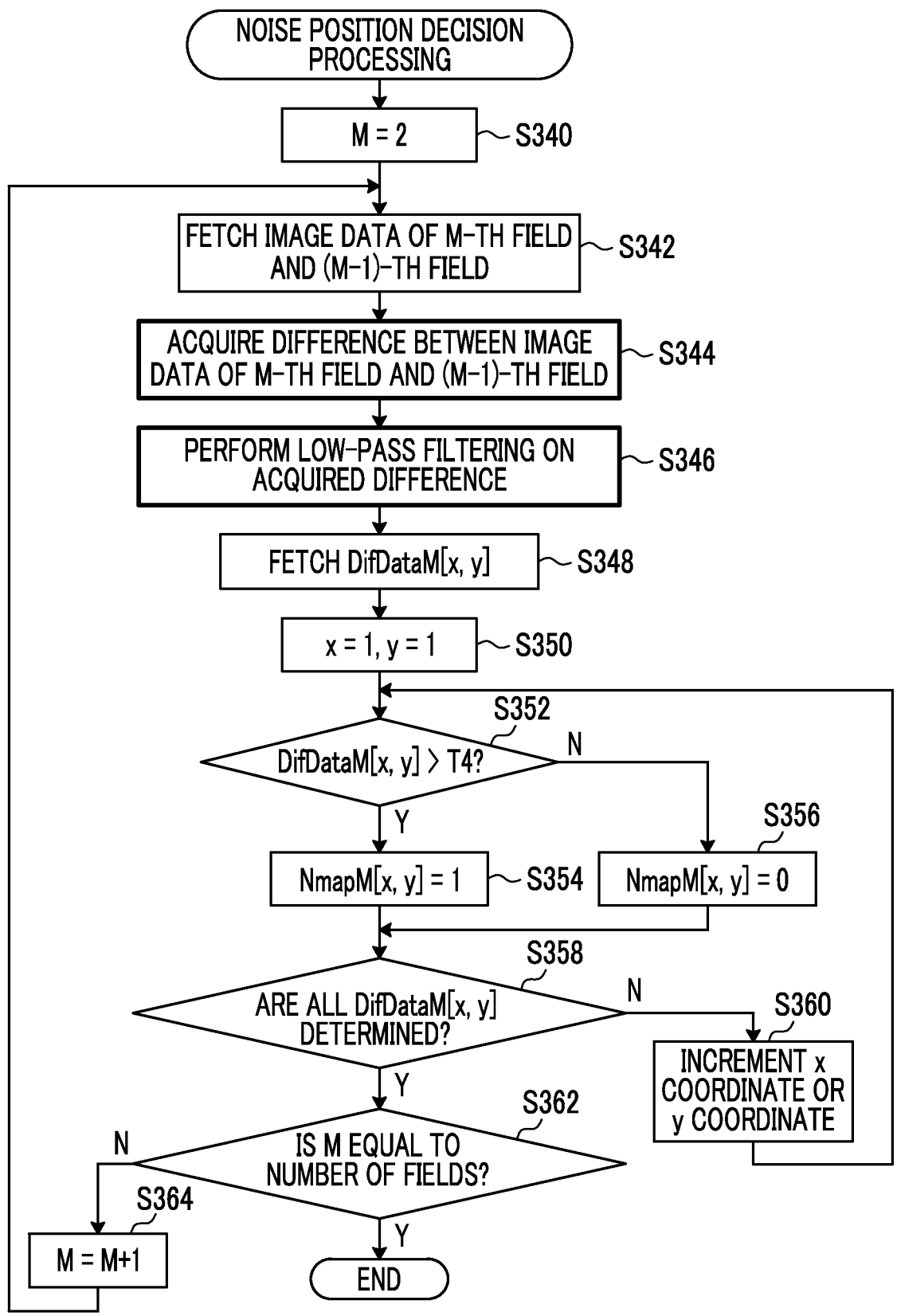
FIG. 16 is a flowchart illustrating one example of a flow of noise position decision processing according to a fourth embodiment.

For example, in the noise position decision processing illustrated in FIG. 16, first, in step S340, an initial value of 2 is stored in the number-of-fields register M, and then, the noise position decision processing transitions to step S342.

In step S342, the correction processing unit 62 fetches the image data of the M-th field and the image data of the (M−1)-th field stored in the storage unit 64, and then, the noise position decision processing transitions to step S344.

In step S344, the correction processing unit 62 acquires the difference data DifDataM[x, y] between the image data of the M-th field and the image data of the (M−1)-th field, and then, the noise position decision processing transitions to step S346.

In step S346, the correction processing unit 62 performs the low-pass filter processing on the acquired difference.

Processing from step S348 illustrated in FIG. 16 is different from processing from step S308 of the noise position decision processing illustrated in FIG. 15 in that processing of step S352 is included instead of processing of step S312. Processing of step S352 is different from processing of step S312 in that a threshold value T4 is employed instead of the threshold value T3. For example, the threshold value T4 refers to a value that is obtained in advance by test using an actual apparatus and/or computer simulation, as a data amount of the optical noise data of one pixel obtained by the optical noise superimposed on the signal electric charges of one pixel accumulated in the memory unit 53.

For example, processing from step S348 illustrated in FIG. 16 is almost the same as processing from step S308 of the noise position decision processing illustrated in FIG. 15 and thus, will be simply described below.

The correction processing unit 62 fetches the difference subjected to the low-pass filter processing and compares the difference with the threshold value T4. The correction processing unit 62 generates a noise map by assigning "1" to the noise map NmapM[1, 1] in a case where the difference is greater than the threshold value T4, and assigning "0" to the noise map NmapM[1, 1] in a case where the difference is less than or equal to the threshold value T4.

An effect of the fourth embodiment is the same as an effect of the third embodiment. Since each field is an image obtained by periodically thinning out the pixels, an elongated subject or a high-frequency subject such as a subject having high contrast may be captured in only one field of adjacent fields at the same coordinate position. In this case, in a case where the difference is acquired, a large numerical value may be obtained. Even in such a case, a numerical value is decreased by applying processing of narrowing a high-frequency bandwidth to the difference using a low-pass filter or the like. Detection error can be decreased, and the noise map NmapM[x, y] having small error can be created.

Fifth Embodiment

Next, for example, a fifth embodiment will be described with reference to the flowchart illustrated in FIG. 17. In the imaging apparatus 100 according to the fifth embodiment, optical noise correction of the image data is performed using optical noise characteristic information. The optical noise characteristic information is information for calculating an optical noise amount occurring in each field from an optical noise amount of the first field subjected to the blank reading, and is prestored in the storage unit 64 or the primary storage unit 26.

The optical noise characteristic information is decided for each imaging element 20. The optical noise characteristic information is acquired at a time of manufacturing or before shipment and is stored in the storage unit 64 or the primary storage unit 26 as a characteristic value indicating a degree of optical noise and a field in which the optical noise occurs in the memory unit 53 which is divided into fields in advance. In the imaging apparatus 100 according to the fifth embodiment, for example, the optical noise characteristic information is stored in a format of a calculation expression or a conversion coefficient. However, the technology of the present disclosure is not limited thereto, and the optical noise characteristic information may be stored as a table.

The optical noise characteristic information may be defined for each pixel in each field. Alternatively, the optical noise characteristic information may be data corresponding to a plurality of pixels in a certain range. In a case where the imaging element has color sensitivity, the occurring amount and an occurring frequency of the optical noise vary depending on color. Thus, the optical noise characteristic information is preferably defined for each element of each color. The optical noise characteristic information may vary for each pixel, each range, or each region. Hereinafter, the optical noise characteristic information about the M-th field will be defined for each pixel and will be denoted by CdataM[x, y].

Figure 17:
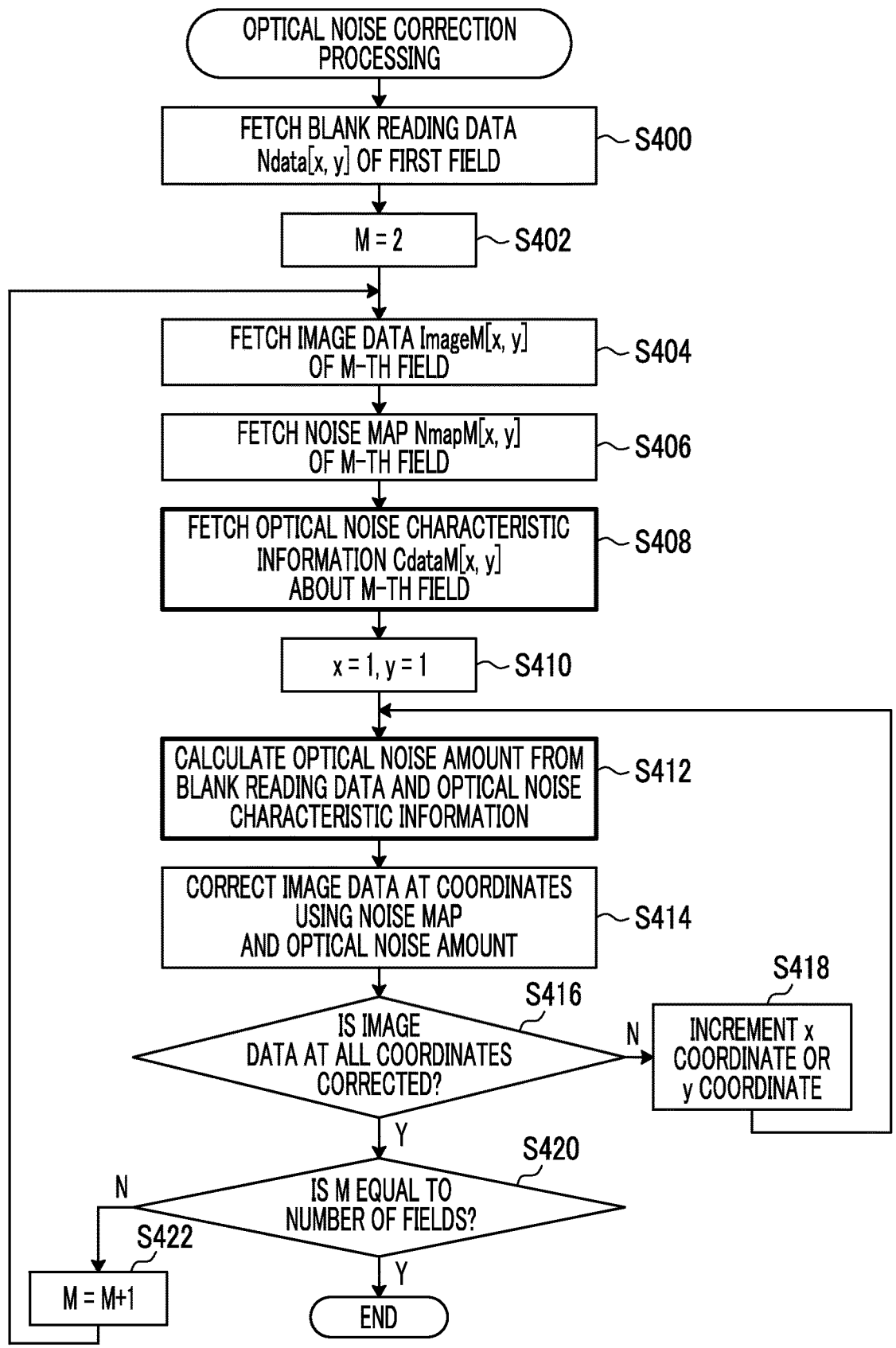
FIG. 17 is a flowchart illustrating one example of a flow of optical noise correction processing according to fifth and sixth embodiments.

For example, in the optical noise correction processing illustrated in FIG. 17, first, in step S400, the correction processing unit 62 fetches the blank reading data Ndata[x, y] of the first field stored in the storage unit 64, and then, the optical noise correction processing transitions to step S402.

In step S402, an initial value of 2 is stored in the number-of-fields register M, and then, the optical noise correction processing transitions to step S404.

In step S404, the correction processing unit 62 fetches the image data ImageM[x, y] of the M-th field, and then, the optical noise correction processing transitions to step S406.

In step S406, the correction processing unit 62 fetches the noise map NmapM[x, y] of the M-th field, and then, the optical noise correction processing transitions to step S408.

In step S408, the correction processing unit 62 acquires the optical noise characteristic information CdataM[x, y] about the M-th field. In step S408, the correction processing unit 62 is one example of an "acquisition unit" according to the embodiment of the technology of the present disclosure.

In subsequent step S410, x=1 and y=1 are stored in the coordinate register as the coordinate data, and then, the optical noise correction processing transitions to step S412.

In step S412, the correction processing unit 62 calculates an optical noise amount from the blank reading data at the coordinates [1, 1] and the optical noise characteristic information. That is, the correction processing unit 62 calculates Ndata[1, 1] using the conversion coefficient or the calculation expression defined in CdataM[1, 1]. The calculated optical noise amount is denoted by CalNdataM[1, 1].

In subsequent step S414, the correction processing unit 62 corrects the image data ImageM[1, 1] at the coordinates [1, 1] using the noise map and the calculated optical noise amount. Correction of ImageM[1, 1] is implemented by multiplying the binarized data NmapM[1, 1] of the noise map and the optical noise amount CalNDataM[1, 1] and subtracting a result of multiplication from the image data ImageM[1, 1].

In subsequent step S416, the correction processing unit 62 determines whether or not the image data of all coordinates is processed. In step S416, in a case where the image data of all coordinates is not processed, a negative determination is made, and the optical noise correction processing transitions to step S418. In step S416, in a case where the image data of all coordinates is processed, a positive determination is made, and the optical noise correction processing transitions to step S420.

In step S418, the correction processing unit 62 increments the x coordinate or the y coordinate. The optical noise correction processing returns to step S412, and processing from step S412 is sequentially performed.

In step S420, the correction processing unit 62 determines whether or not M is equal to the number of fields. In step S420, in a case where M is not equal to the number of fields, a negative determination is made, and the optical noise correction processing transitions to step S422.

In step S422, the correction processing unit 62 increments M by one, and the optical noise correction processing returns to step S404. The correction processing unit 62 sequentially processes the subsequent field from step S404.

In step S420, in a case where M is equal to the number of fields, a positive determination is made, and the correction processing unit 62 finishes the optical noise correction processing.

According to the fifth embodiment, the optical noise amount that has to be corrected in each field can be more accurately calculated using the prestored optical noise characteristic information. Particularly, in a case where the imaging element has color sensitivity, the optical noise amount can be more accurately calculated by comprising the optical noise characteristic information for each color.

Sixth Embodiment

Next, a sixth embodiment will be described. The imaging apparatus 100 according to the sixth embodiment is different from the imaging apparatus 100 according to the fifth embodiment in that a ratio of the occurring amount of the optical noise is employed as the optical noise characteristic information instead of the optical noise characteristic information. In this embodiment, the optical noise characteristic information is a value based on a ratio of a predetermined value as optical noise of a region read out again by the correction processing unit 62 among the plurality of regions, and a predetermined value as optical noise of a region different from the region among the plurality of regions.

In the imaging apparatus 100 according to the sixth embodiment, a ratio of an optical noise amount PreNdataM [x, y] measured in advance and the blank reading data Ndata[x, y] of the first field is used instead of the optical noise characteristic information CdataM[x, y] described in the fifth embodiment. That is, "CdataM[x, y]=PreNdataM[x, y]/Ndata[x, y]" is established. Furthermore, the optical noise characteristic information CdataM[x, y] is preferably set for each color.

According to the imaging apparatus 100 according to the sixth embodiment, the optical noise amount that has to be corrected in each field can be more accurately and quickly calculated using the prestored optical noise characteristic information. Particularly, according to the imaging apparatus 100 according to the sixth embodiment, in a case where the imaging element has color sensitivity, the optical noise amount can be more accurately and quickly calculated by comprising the optical noise characteristic information for each color.

Seventh Embodiment

Next, for example, a seventh embodiment will be described with reference to the flowchart illustrated in FIG. 18. In the imaging apparatus 100 according to the seventh embodiment, a method of correcting the optical noise using a simpler method than the imaging apparatus 100 described in each embodiment above is employed. Specifically, the method is a method of obtaining the corrected image data by correcting, by the correction processing unit 62, the captured image data stored in the memory unit 53 for each of the plurality of regions in accordance with the optical noise decided in accordance with each read region image data.

Figure 18:
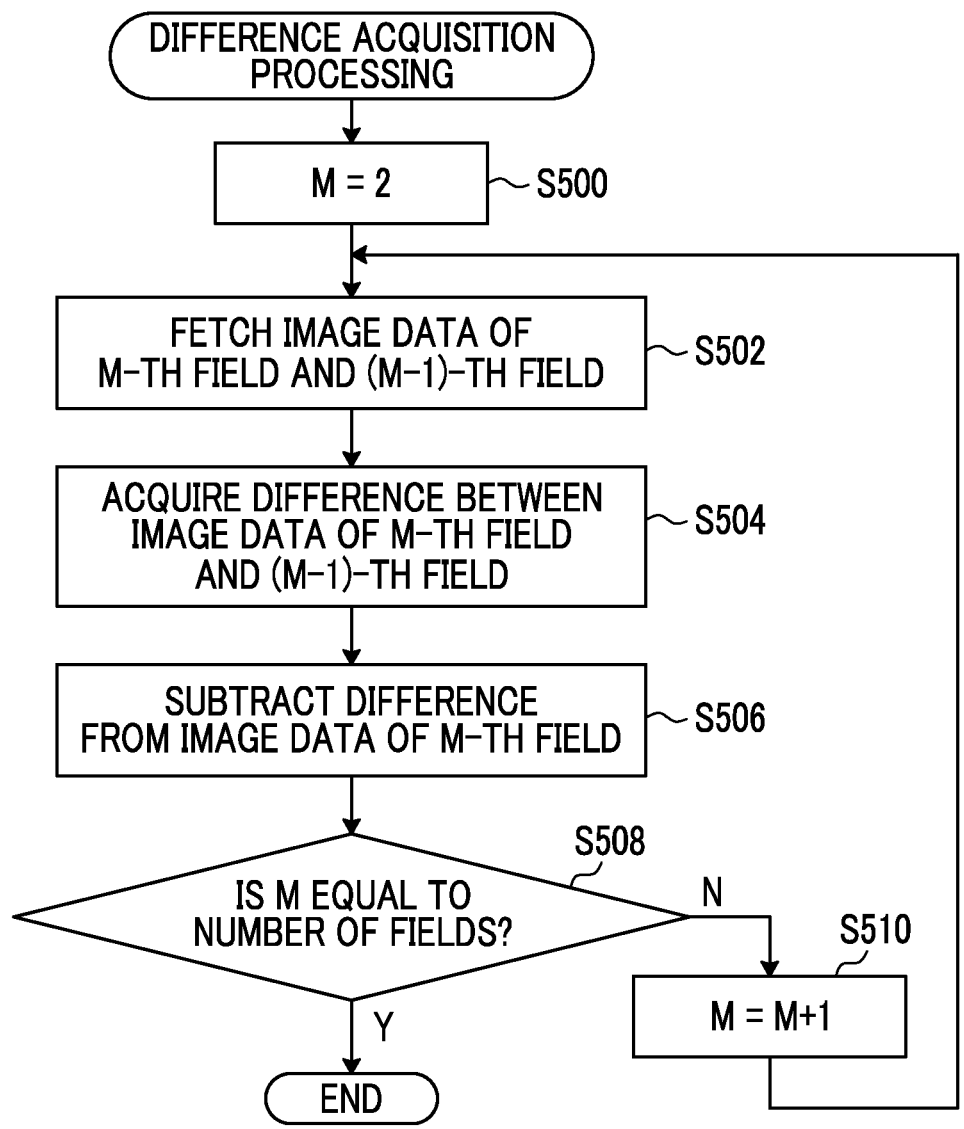
FIG. 18 is a flowchart illustrating one example of a flow of difference acquisition processing according to a seventh embodiment.

For example, in the difference acquisition processing illustrated in FIG. 18, first, in step S500, an initial value of "2" is stored in the number-of-fields register M, and then, the ddifference acquisition processing transitions to step S502.

In step S502, the correction processing unit 62 fetches the image data ImageM[x, y] of the M-th field and the image data Image(M−1)[x, y] of the (M−1)-th field, and then, the difference acquisition processing transitions to step S504.

In step S504, the correction processing unit 62 acquires the difference data DifDataM[x, y] between the image data of the M-th field and the image data of the (M−1)-th field. That is, DifDataM[x, y] is represented by "DifDataM[x, y]=ImageM[x, y]−Image(M−1)[x, y]".

The difference data DifDataM[x, y] corresponds to the optical noise that occurs in the M-th field while the image data of the M-th field is read out after the image data of the (M−1)-th field is read out.

In subsequent step S506, the correction processing unit 62 subtracts the difference data DifDataM[x, y] acquired in step S504 from the image data of the M-th field. Accordingly, the image data of the M-th field from which the optical noise is removed is obtained.

In subsequent step S508, the correction processing unit 62 determines whether or not M is equal to the number of fields. In step S508, in a case where M is not equal to the number of fields, a negative determination is made, and the difference acquisition processing transitions to step S510.

In step S510, the correction processing unit 62 increments M by one, and the difference acquisition processing returns to step S502. The correction processing unit 62 sequentially processes the subsequent field from step S502.

In step S508, in a case where M is equal to the number of fields, a positive determination is made, and the correction processing unit 62 finishes the difference acquisition processing.

In conclusion, based on a comparison result between a pair of region image data adjacent in the reading order, the corrected image data is obtained by deciding a pixel position having a difference from the region image data that is later in the reading order, and correcting each region in accordance with the decided pixel position and the difference.

According to the imaging apparatus 100 according to the seventh embodiment, since the difference between the fields adjacent in the reading order is acquired without performing the blank reading of the first field, the optical noise of each field can be more quickly corrected than in a case where the blank reading of the first field is performed.

Eighth Embodiment

Next, for example, an eighth embodiment will be described with reference to the flowchart illustrated in FIG. 19. In the eighth embodiment, the imaging apparatus 100 employs a method of selecting whether or not correction of the optical noise described in the first to seventh embodiment is necessary.

Figure 19:
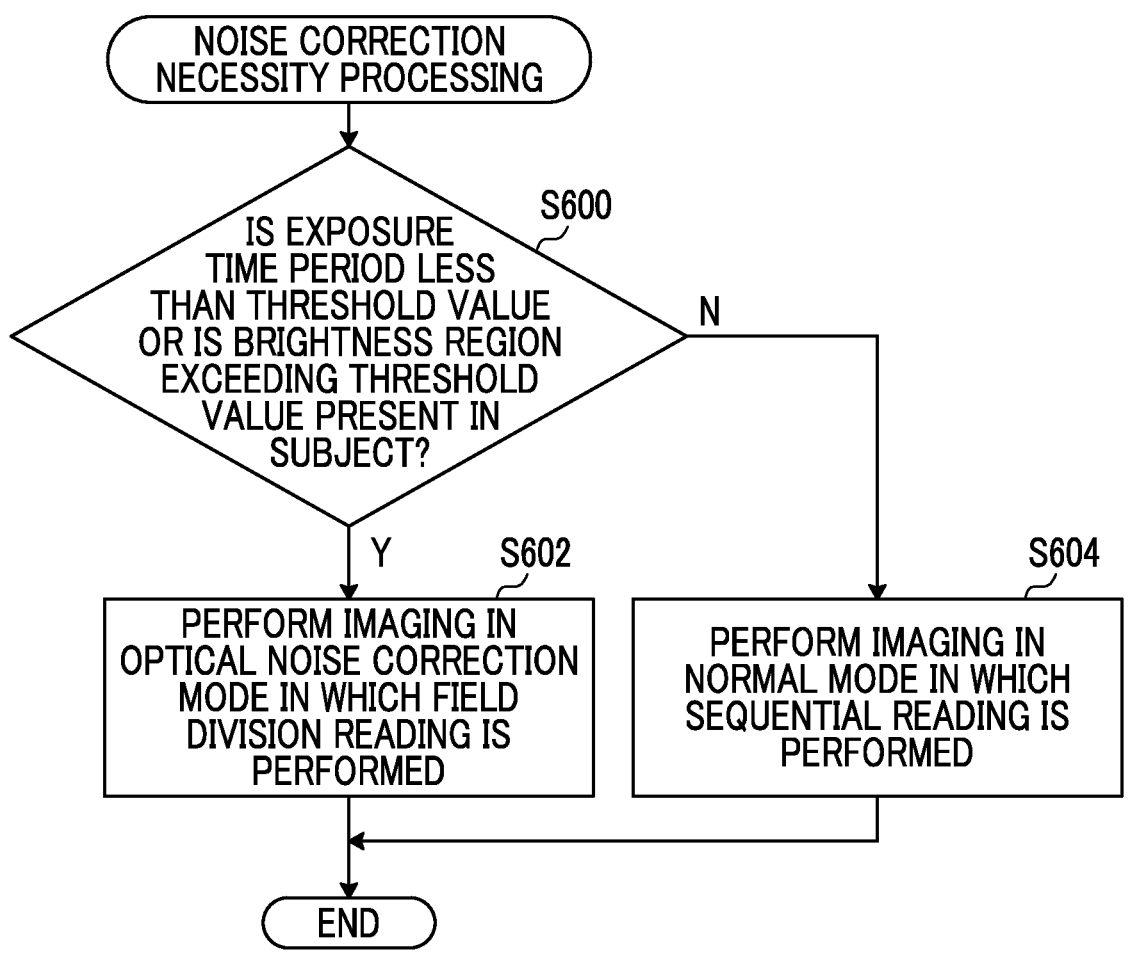
FIG. 19 is a flowchart illustrating one example of a flow of noise correction necessity processing according to an eighth embodiment.

FIG. 19 illustrates one example of a flow of noise correction necessity processing executed by the image processing circuit 61. For example, as illustrated in FIG. 19, first, in step S600, the image processing circuit 61 determines whether or not the exposure time period that is an imaging time period is shorter than a predetermined time period threshold value in an imaging condition set in a manual mode by the user or an imaging condition set in an auto imaging mode by the CPU 12. In addition, the image processing circuit 61 determines whether or not an image region having brightness exceeding a predetermined threshold value is present in the subject in live view image data stored in the memory unit 53. The image processing circuit 61 determines whether or not at least one of these two conditions is satisfied.

In step S600, in a case where at least one of two conditions is satisfied, a positive determination is made, and the noise correction necessity processing transitions to step S602. In step S600, in a case where any of two conditions is not satisfied, a negative determination is made, and the noise correction necessity processing transitions to step S604.

In step S602, the correction processing unit 62 obtains a corrected image by executing an optical noise correction mode. The optical noise correction mode refers to an operation mode in which correction of removing the optical noise described in each embodiment above is performed on the captured image data obtained by imaging by the photoelectric conversion element 51.

In step S604, the image processing circuit 61 executes, on the captured image data obtained by imaging by the photoelectric conversion element 51, normal reading processing in which correction of removing the optical noise described in each embodiment above is not performed.

While a case in which processing of step S600 is executed by the image processing circuit 61 is illustrated in the eighth embodiment, the technology of the present disclosure is not limited thereto. For example, processing of step S600 may be executed by the CPU 12, and an execution result of the CPU 12 may be transmitted to the image processing circuit 61.

As the exposure time period is shortened, a reading time period of the captured image data is relatively lengthened. Thus, the amount of the optical noise occurring during the reading time period is relatively increased compared to optical image data obtained from the subject in the exposure time period. That is, an effect of the optical noise is increased. Thus, in a case where the imaging time period is shorter than the predetermined threshold value, an advantage of performing the optical noise correction is increased. In addition, in a case where the subject is imaged by the imaging apparatus 100, the occurring amount of the optical noise is increased in accordance with an increase in brightness of the subject. Thus, in a case where a brightness region that exceeds a predetermined threshold value is present in the subject, an advantage of performing the optical noise correction is increased.

According to the imaging apparatus 100 according to the eighth embodiment, in a case where the imaging time period is less than the threshold value or an image region having brightness exceeding the threshold value is present in the subject, imaging is performed in the optical noise correction mode. Otherwise, imaging is performed in a normal mode in which the optical noise correction is not performed. Thus, according to the imaging apparatus 100 according to the eighth embodiment, a frequency of performing correction of removing the optical noise on the captured image data in the optical noise correction mode can be maintained as low as possible.

Figure 20:
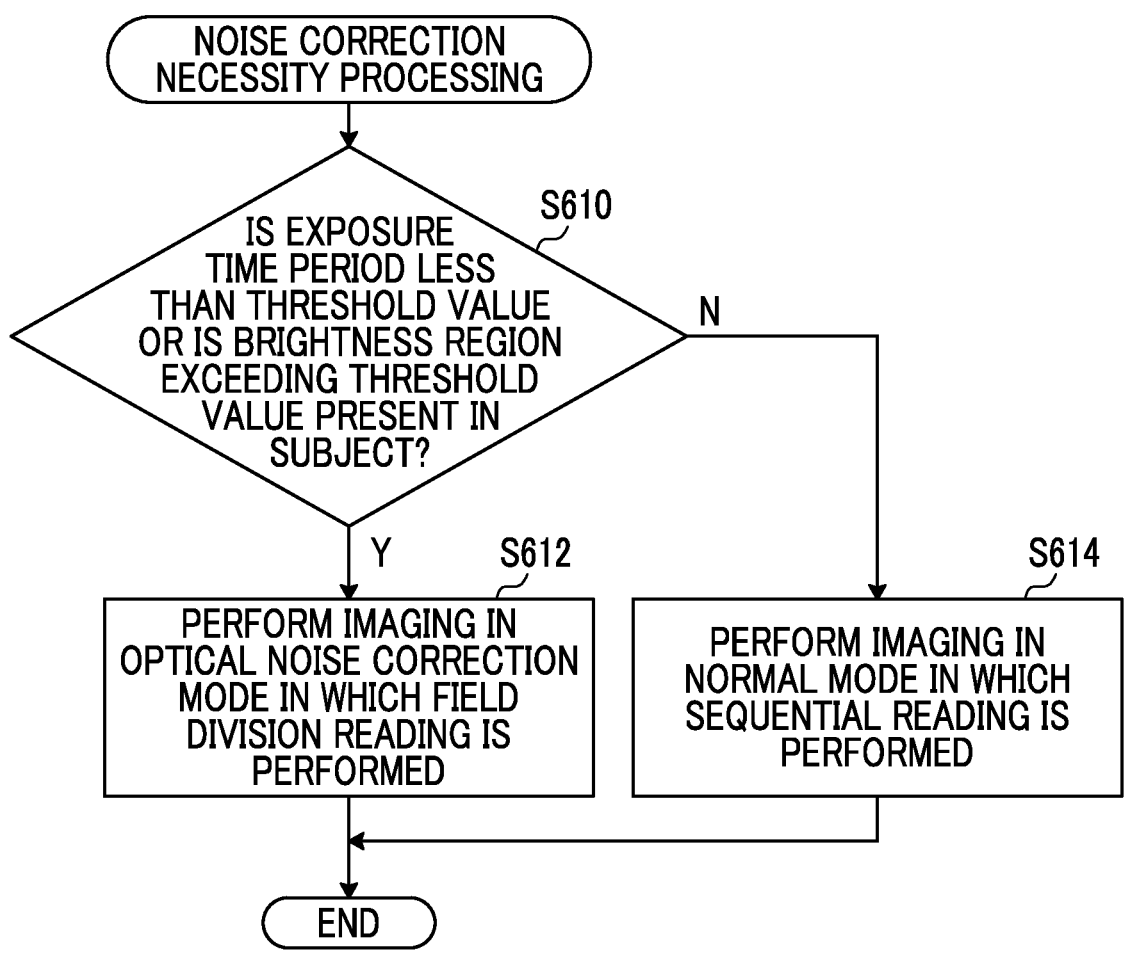
FIG. 20 is a flowchart illustrating a modification example of the flow of noise correction necessity processing according to the eighth embodiment.

In addition, for example, as illustrated in FIG. 20, in step S610, the image processing circuit 61 may determine whether or not the imaging time period is less than the threshold value and the brightness region exceeding the threshold value is present in the subject. In step S610, in a case where the exposure time period is less than the threshold value and the brightness region exceeding the threshold value is present in the subject, a positive determination is made, and the noise correction necessity processing transitions to step S612.

While a case in which processing of step S610 is executed by the image processing circuit 61 is illustrated, the technology of the present disclosure is not limited thereto. For example, processing of step S610 may be executed by the CPU 12, and an execution result of the CPU 12 may be transmitted to the image processing circuit 61.

In step S612, the correction processing unit 62 executes processing corresponding to processing of step S602 illustrated in FIG. 19. In step S614, the image processing circuit 61 executes processing corresponding to processing of step S604 illustrated in FIG. 19. Accordingly, even in a case where the noise correction necessity processing illustrated in FIG. 20 is executed, the same effect as a case where the noise correction necessity processing illustrated in FIG. 19 is executed is obtained.

The optical noise correction processing described in each embodiment above is merely one example. Accordingly, unnecessary steps may be removed, new steps may be added, or a processing order may be changed without departing from a gist of the optical noise correction processing.

In the above description, an example of a form in which various types of processing according to the embodiment of the technology of the present disclosure are executed by the image processing circuit 61 is illustrated. However, the technology of the present disclosure is not limited thereto, and the processing may be implemented by executing various programs according to the embodiment of the technology of the present disclosure by the CPU 12. Furthermore, the technology of the present disclosure is not limited thereto, and various programs according to the embodiment of the technology of the present disclosure may be executed by a CPU other than the CPU 12.

Here, "various types of processing according to the embodiment of the technology of the present disclosure" refer to the difference acquisition processing, the noise position decision processing, the field image correction processing, the optical noise correction processing, and the noise correction necessity processing. In addition, "various programs according to the embodiment of the technology of the present disclosure" refer to a difference acquisition program, a noise position decision program, a field image correction program, an optical noise correction program, and a noise correction necessity program.

That is, the difference acquisition processing is implemented by executing the difference acquisition program by the image processing circuit 61 or the CPU 12. The noise position decision processing is implemented by executing the noise position decision program by the image processing circuit 61 or the CPU 12. The field image correction processing is implemented by executing the field image correction program by the image processing circuit 61 or the CPU 12. The optical noise correction processing is implemented by executing the optical noise correction program by the image processing circuit 61 or the CPU 12. The noise correction necessity processing is implemented by executing the noise correction necessity program by the image processing circuit 61 or the CPU 12. Hereinafter, the difference acquisition program, the noise position decision program, the field image correction program, the optical noise correction program, and the noise correction necessity program will be referred to as a "program PG" unless otherwise necessary to distinguish therebetween.

Figure 21:
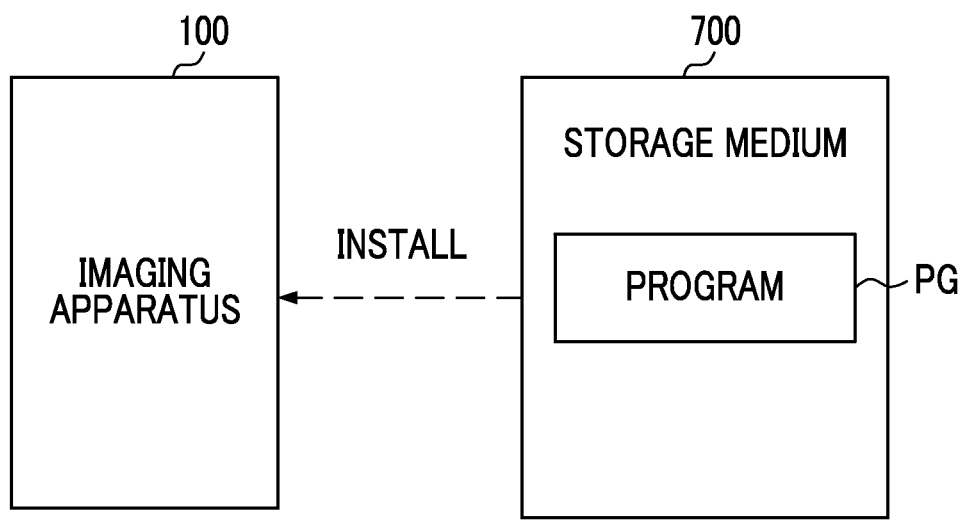
FIG. 21 is a schematic diagram illustrating one example of a state where a program stored in a portable storage medium is installed on imaging apparatuses according to the first to eighth embodiments.

For example, as illustrated in FIG. 21, the program PG may be stored in any portable storage medium 700 such as an SSD, a USB memory, or a DVD-ROM. In this case, the program PG of the storage medium 700 is installed on the imaging apparatus 100, and the installed program PG is executed by the CPU 12.

Alternatively, the program PG may be stored in a storage unit of another computer, a server apparatus, or the like connected to the imaging apparatus 100 through a communication network (not illustrated), and the program PG may be downloaded in accordance with a request from the imaging apparatus 100. In this case, the downloaded program PG is executed by the CPU 12 of the imaging apparatus 100.

In the above embodiments, for example, various processors illustrated below can be used as a hardware resource for executing various types of processing according to the embodiment of the technology of the present disclosure. For example, as described above, a CPU that is a general-purpose processor functioning as a hardware resource for executing various types of processing according to the embodiment of the technology of the present disclosure by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor.

The hardware resource for executing various types of processing according to the embodiment of the technology of the present disclosure may be configured with one of those various processors or may be configured with a combination of two or more processors of the same type or different types (for example, a combination of a plurality of FPGAs or a combination of a CPU and an FPGA). Alternatively, the hardware resource for executing various types of processing according to the embodiment of the technology of the present disclosure may be one processor.

As an example of a configuration with one processor, first, as represented by a computer such as a client and a server, a form in which one processor is configured with a combination of one or more CPUs and software and this processor functions as the hardware resource for executing various types of processing according to the embodiment of the technology of the present disclosure is available. Second, as represented by an SoC or the like, a form of using a processor that implements, by one IC chip, a function of the entire system including a plurality of hardware resources for executing various types of processing according to the embodiment of the technology of the present disclosure is available. Accordingly, various types of processing according to the embodiment of the technology of the present disclosure are implemented using one or more of above various processors as a hardware resource.

Furthermore, as a hardware structure of those various processors, more specifically, an electric circuit in which circuit elements such as semiconductor elements are combined can be used.

Ninth Embodiment

While the imaging apparatus 100 is illustrated in each embodiment above, for example, a mobile phone, a smartphone, a PDA, or a portable game console each having a camera function is illustrated as a portable terminal apparatus that is a modification example of the imaging apparatus 100. Hereinafter, a smartphone will be illustratively described with reference to the drawings.

Figure 22:
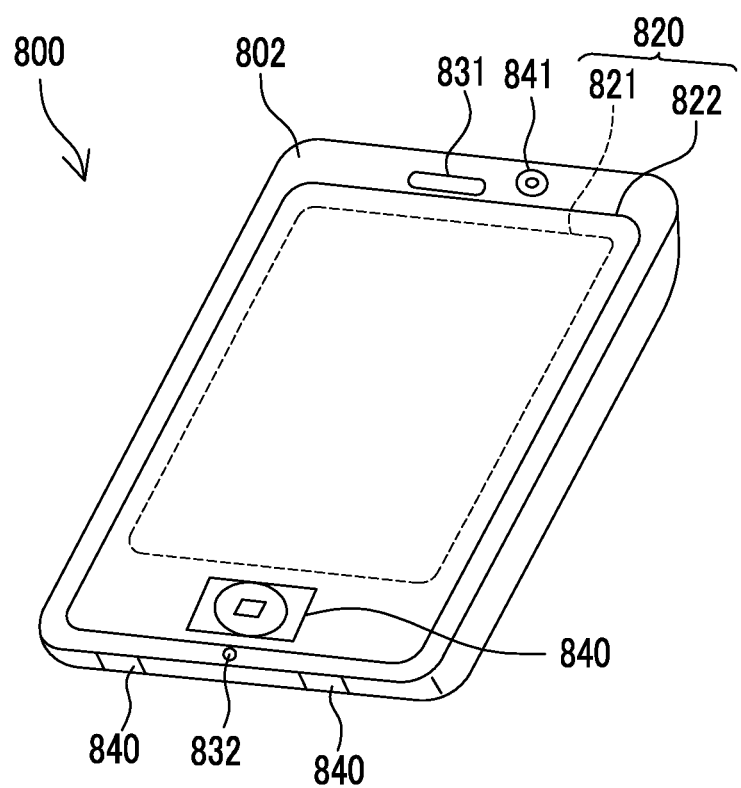
FIG. 22 is a perspective view illustrating one example of an exterior of a smartphone according to a ninth embodiment.

FIG. 22 is a perspective view illustrating one example of an exterior of a smartphone 800. The smartphone 800 includes a casing 802 having a flat plate shape and comprises a display and input unit 820 in which a display panel 821 as a display unit and an operation panel 822 as an input unit are integrated on one surface of the casing 802. The casing 802 comprises a speaker 831, a microphone 832, an operation unit 840, and a camera unit 841. A configuration of the casing 802 is not limited thereto. For example, a configuration in which the display unit and the input unit are independent can be employed, or a configuration having a folding structure or a sliding structure can be employed.

Figure 23:
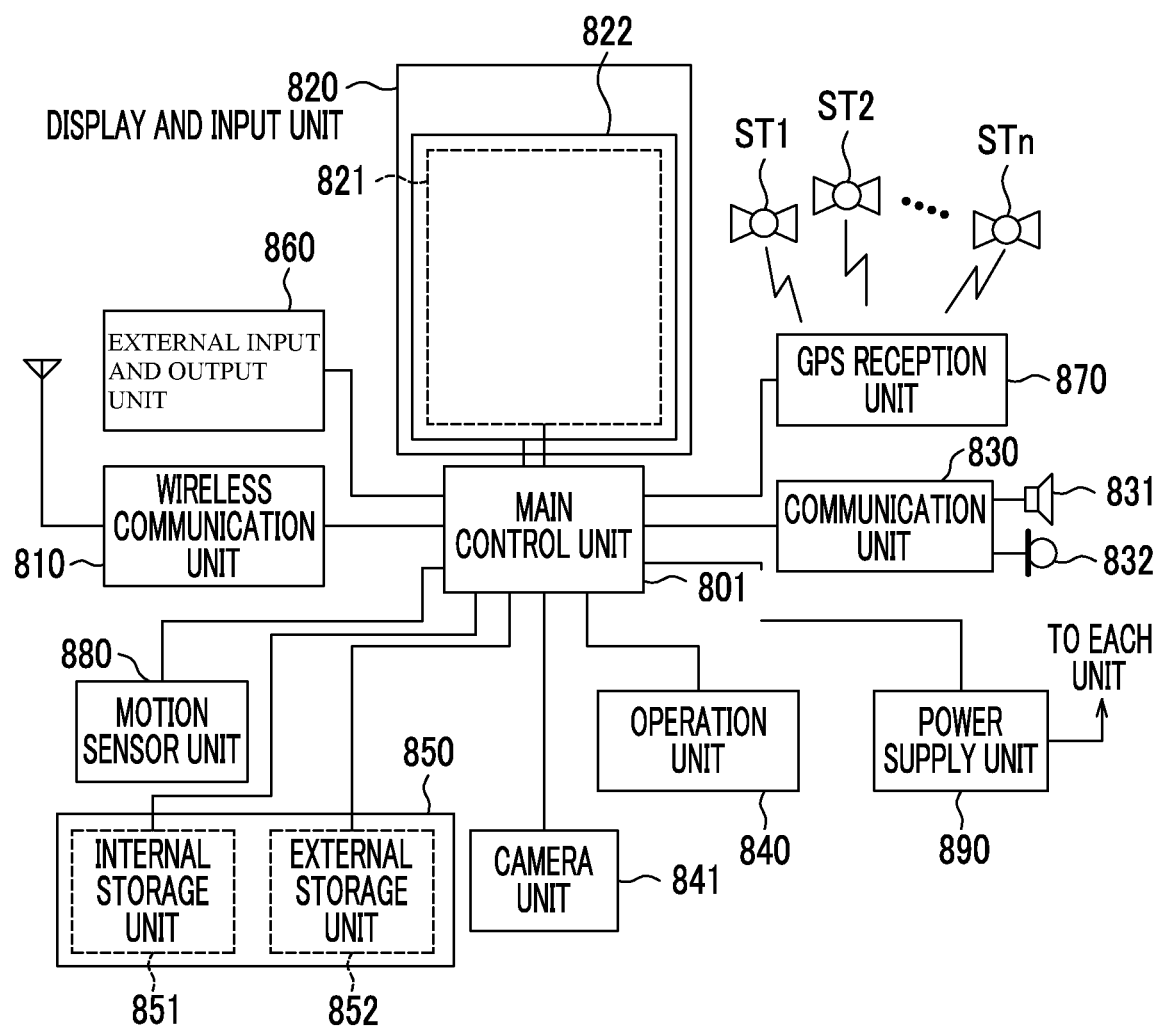
FIG. 23 is a block diagram illustrating one example of a main configuration of an electric system of the smartphone according to the ninth embodiment.

FIG. 23 is a block diagram illustrating one example of a configuration of the smartphone 800 illustrated in FIG. 22. For example, as illustrated in FIG. 23, the smartphone 800 comprises, as main constituents, a wireless communication unit 810, the display and input unit 820, a communication unit 830, the operation unit 840, the camera unit 841, a storage unit 850, and an external input and output unit 860. In addition, the smartphone 800 comprises, as main constituents, a GPS reception unit 870, a motion sensor unit 880, a power supply unit 890, and a main control unit 801. A wireless communication function of performing mobile wireless communication with a base station apparatus BS through a mobile communication network NW is provided as a main function of the smartphone 800.

The wireless communication unit 810 wirelessly communicates with the base station apparatus BS accommodated in the mobile communication network NW in accordance with an instruction from the main control unit 801. By using wireless communication, various types of data such as voice data, image data, electronic mail data, Web data, and/or streaming data are transmitted and received.

The display and input unit 820 is a so-called touch panel and comprises the display panel 821 and the operation panel 822. Thus, the display and input unit 820 visually delivers information to the user by displaying a still image, a motion picture, text information, and the like and detects a user operation with respect to displayed information under control of the main control unit 801. In a case of viewing generated 3D, the display panel 821 is preferably a 3D display panel.

The display panel 821 is implemented using an LCD, an OELD, or the like as a display device. The operation panel 822 is a device that is placed such that an image displayed on a display surface of the display panel 821 can be visually recognized, and that detects one or a plurality of coordinates by being operated with a finger of the user and/or a stylus. In a case where the device is operated with the finger of the user and/or the stylus, a detection signal generated by the operation is output to the main control unit 801. Next, the main control unit 801 detects an operation position (coordinates) on the display panel 821 based on the received detection signal.

In the display and input unit 820, the display panel 821 and the operation panel 822 of the smartphone 800 are configured as a single unit. Specifically, the operation panel 822 is overlaid on the display panel 821, and the operation panel 822 completely covers the display panel 821. In a case of employing such arrangement, the operation panel 822 may have a function of detecting the user operation even in a region outside the display panel 821. In other words, the operation panel 822 may comprise a display region that is a detection region for a superimposed part overlaid on the display panel 821, and a non-display region that is the other detection region for an outer edge part not overlaid on the display panel 821.

A size of the display region may completely match a size of the display panel 821, but both sizes do not need to match. In addition, the operation panel 822 may comprise two sensitive regions of the outer edge part and the other inner part. In addition, a width of the outer edge part is appropriately set in accordance with a size and the like of the casing 802. Furthermore, a matrix switch method, a resistive film method, a surface acoustic wave method, an infrared method, an electromagnetic induction method, an electrostatic capacitance method, and the like are illustrated as a position detection method employed in the operation panel 822, and any of the methods can be employed.

The communication unit 830 comprises the speaker 831 and/or the microphone 832. The communication unit 830 converts voice of the user input through the microphone 832 into voice data that can be processed in the main control unit 801, and outputs the voice data to the main control unit 801. In addition, the communication unit 830 decodes voice data received by the wireless communication unit 810 or the external input and output unit 860 and outputs the decoded voice data from the speaker 831. In addition, for example, the speaker 831 can be mounted on the same surface as a surface on which the display and input unit 820 is disposed, and the microphone 832 can be mounted on a side surface of the casing 802.

The operation unit 840 is a hardware key using a key switch or the like and receives an instruction from the user. For example, as illustrated in FIG. 22, the operation unit 840 is a push button (momentary operation method) switch that is mounted on a side surface of the casing 802 of the smartphone 800, and is switched ON in a case where the switch is pushed with the finger or the like and enters an OFF state by restoring force of a spring or the like in a case where the finger is released.

The storage unit 850 stores the program PG, control data, application software, and address data in which a name, a telephone number, and the like of a communication counterpart are associated. In addition, the storage unit 850 stores data of transmitted and received electronic mails. In addition, the storage unit 850 stores Web data downloaded by Web browsing and/or contents data downloaded by Web browsing. In addition, the storage unit 850 temporarily stores streaming data or the like. In addition, the storage unit 850 includes an internal storage unit 851 incorporated in the smartphone and an external storage unit 852 including a slot for an attachable and detachable external memory. Each of the internal storage unit 851 and the external storage unit 852 constituting the storage unit 850 is implemented using a storage medium of a flash memory type, a hard disk type, or the like. Besides, a memory of a multimedia card micro type or a card type, a RAM, or a ROM can be illustrated as the storage medium.

The external input and output unit 860 is a device having a role of an interface for all external apparatuses connected to the smartphone 800 and is communicably connected to other external apparatuses directly or indirectly by communication or the like or through a network. For example, a USB is illustrated for communication or the like with other external apparatuses. For example, the Internet, a wireless LAN, Bluetooth (registered trademark), RFID, or IrDA (registered trademark) is illustrated as the network. In addition, UWB (registered trademark), ZigBee (registered trademark), or the like is illustrated as another example of the network.

For example, a wired headset, a wireless headset, a wired external charger, a wireless external charger, a wired data port, and/or a wireless data port are illustrated as the external apparatuses connected to the smartphone 800. A memory card connected through a card socket is illustrated as another example of the external apparatuses connected to the smartphone 800. A SIM/UIM card is illustrated as another example of the external apparatuses connected to the smartphone 800. An external audio and video apparatus connected through an audio and video I/O terminal is illustrated as another example of the external apparatuses connected to the smartphone 800. In addition to the external audio and video apparatus, an external audio and video apparatus that is wirelessly connected is illustrated. Instead of the external audio and video apparatus, for example, a smartphone that is connected in a wired or wireless manner can also be applied. In addition, instead of the external audio and video apparatus, for example, a personal computer that is connected in a wired or wireless manner can also be applied. In addition, instead of the external audio and video apparatus, for example, a PDA that is connected in a wired or wireless manner can also be applied. In addition, instead of the external audio and video apparatus, for example, an earphone can also be applied.

The external input and output unit delivers data transferred from the external apparatuses to each constituent inside the smartphone 800 or transfers data inside the smartphone 800 to the external apparatuses.

The GPS reception unit 870 receives a GPS signal transmitted from GPS satellites ST1 to STn, executes position measurement calculation processing based on a plurality of received GPS signals, and detects a position (current position of the smartphone 800) represented by a latitude, a longitude, and/or an altitude of the smartphone 800 in accordance with an instruction from the main control unit 801. In a case where positional information indicating the current position of the smartphone 800 can be acquired from the wireless communication unit 810 or the external input and output unit 860, the GPS reception unit 870 can detect the position using the positional information.

The motion sensor unit 880 comprises, for example, a three-axis acceleration sensor and detects a physical motion of the smartphone 800 in accordance with an instruction from the main control unit 801. By detecting the physical motion of the smartphone 800 by the motion sensor unit 880, a movement direction and an acceleration of the smartphone 800 are detected. This detection result is output to the main control unit 801.

The power supply unit 890 supplies power stored in a battery (not illustrated) to each unit of the smartphone 800 in accordance with an instruction from the main control unit 801.

The main control unit 801 comprises a microprocessor and controls each unit of the smartphone 800 by operating in accordance with the program PG and the control data stored in the storage unit 850. In addition, the main control unit 801 has a mobile communication control function of controlling each unit of a communication system in order to perform voice communication and data communication through the wireless communication unit 810. In addition, the main control unit 801 has an application processing function.

The application processing function is implemented by operating the main control unit 801 in accordance with the application software stored in the storage unit 850. For example, an infrared communication function, an electronic mail function, and a Web browsing function are illustrated as the application processing function. The infrared communication function is a function of performing data communication with an opposing apparatus by controlling the external input and output unit 860. The electronic mail function is a function of transmitting and receiving electronic mails. The Web browsing function is a function of browsing a Web page.

In addition, the main control unit 801 has an image processing function. The image processing function is a function of displaying a video on a display and input unit 820 based on received data and/or downloaded data of a still image and/or a motion image such as streaming data. That is, the image processing function refers to a function of decoding the image data, performing image processing on a decoding result, and displaying an image on the display and input unit 820 by the main control unit 801.

Furthermore, the main control unit 801 executes a display control for the display panel 821 and an operation detection control for detecting a user operation performed through the operation unit 840 and the operation panel 822.

By executing the display control, the main control unit 801 displays a soft key such as an icon and a scroll bar for starting the application software or displays a window for creating an electronic mail. The scroll bar refers to a soft key for receiving an instruction to move a display part of an image for a large image or the like that cannot be accommodated in the display region of the display panel 821.

By executing the operation detection control, the main control unit 801 detects the user operation performed through the operation unit 840 or receives an operation performed on the icon and an input of a character string in an input field of the window through the operation panel 822. In addition, by executing the operation detection control, the main control unit 801 receives a scroll request for the displayed image through the scroll bar.

Furthermore, the main control unit 801 comprises a touch panel control function. By executing the operation detection control, the main control unit 801 determines whether the operation position on the operation panel 822 is in the superimposed part (display region) overlaid on the display panel 821 or the other outer edge part (non-display region) not overlaid on the display panel 821. By causing the main control unit 801 to perform the touch panel control function, the main control unit 801 receives this determination result and controls the sensitive regions of the operation panel 822 and a display position of the soft key.

The main control unit 801 can also detect a gesture operation performed on the operation panel 822 and execute a preset function in accordance with the detected gesture operation. The gesture operation is not a simple touch operation in the related art and means an operation of drawing a trajectory with the finger or the like, designating a plurality of positions at the same time, or as a combination thereof, drawing a trajectory from at least one of the plurality of positions.

The camera unit 841 is a digital camera that performs imaging using a CMOS sensor, and has the same function as the imaging apparatus 100 illustrated in FIG. 1 and the like.

The camera unit 841 can switch between a manual focus mode and an auto focus mode. In a case where the manual focus mode is selected, an imaging lens of the camera unit 841 is focused by operating the operation unit 840 or a focus icon button or the like displayed on the display and input unit 820. At a time of the manual focus mode, for example, a focusing state at a time of a manual focus can be checked by displaying a live view image in which a split image is composited on the display panel 821. The hybrid finder 220 illustrated in FIG. 1 may also be disposed in the smartphone 800.

In addition, the camera unit 841 converts the image data obtained by imaging into compressed image data of, for example, JPEG under control of the main control unit 801. The image data obtained by conversion is recorded in the storage unit 850 or output through the external input and output unit 860 and/or the wireless communication unit 810. In the smartphone 800 illustrated in FIG. 22, the camera unit 841 is mounted on the same surface as the display and input unit 820. However, a mounting position of the camera unit 841 is not limited thereto. The camera unit 841 may be mounted on a rear surface of the display and input unit 820, or a plurality of camera units 841 may be mounted. In a case where the plurality of camera units 841 are mounted, imaging is performed by a single camera unit 841 by switching the camera unit 841 used for imaging, or imaging is performed by using the plurality of camera units 841 at the same time.

The camera unit 841 is used for various functions of the smartphone 800. For example, an image acquired by the camera unit 841 is displayed on the display panel 821. In addition, the image of the camera unit 841 is used as one of operation inputs of the operation panel 822. In addition, in a case where the GPS reception unit 870 detects the position, the position is detected by referring to the image from the camera unit 841. In addition, the main control unit 801 determines an optical axis direction of the camera unit 841 of the smartphone 800 or determines the current usage environment by referring to the image from the camera unit 841 without using the three-axis acceleration sensor. Furthermore, the main control unit 801 determines the optical axis direction of the camera unit 841 of the smartphone 800 or determines the current usage environment using the three-axis acceleration sensor together. The image from the camera unit 841 can also be used in the application software.

Besides, the main control unit 801 adds various information to image data of a still picture or a motion picture and records the image data to which various information is added, in the storage unit 850 or outputs the image data through the external input and output unit 860 or the wireless communication unit 810. Here, for example, "various information" is illustrated by positional information acquired by the GPS reception unit 870 and voice information acquired by the microphone 832. Text information obtained by performing voice and text conversion by the main control unit or the like may be used as the voice information. Besides, "various information" may include attitude information and the like acquired by the motion sensor unit 880.

Above described contents and illustrated contents are detailed description for parts according to the embodiment of the technology of the present disclosure and are merely one example of the technology of the present disclosure. For example, description related to the above configurations, functions, operations, and effects is description related to one example of configurations, functions, operations, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, may be only B, or may be a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

The present application claims priority of JP2018-141678 which is a Japanese application filed on Jul. 27, 2018, and the entire content of this application is incorporated in the present specification by reference.

What is claimed is:

1. An image processing device comprising:
an image processor that
reads out image data which is captured by an imaging element, the imaging element including a plurality of photoelectric conversion elements and a plurality of memories each provided respectively for each of the plurality of photoelectric conversion elements and temporarily storing signal electric charges output from the plurality of photoelectric conversion elements, and transferred to the memories and on which optical noise is superimposed, as region image data for each of a plurality of divided regions of the memories, and
reads out data of a predetermined region again after reading for each region image data is finished; and
a display processor that outputs corrected image data obtained by correcting captured image data for each of the plurality of regions in accordance with optical noise decided in accordance with the data read out again by the image processor, the captured image data being captured by the imaging element and stored in the memories, wherein
the predetermined region is a region in which the region image data is read out first from the memories.

2. The image processing device according to claim 1, wherein
based on a comparison result between a pair of region image data adjacent in a reading order of the image processor, the corrected image data is obtained by deciding a pixel position having the optical noise from region image data that is later in the reading order of the image processor, and correcting the captured image data for each region in accordance with the decided pixel position and an amount of the optical noise.

3. The image processing device according to claim 2, wherein
the comparison result is a difference between image data of the pair of adjacent region image data.

4. The image processing device according to claim 2, wherein
the plurality of photoelectric conversion elements have sensitivity to each of a plurality of predetermined primary colors.

5. The image processing device according to claim 4, wherein
each region image data is region image data in which the image data stored in the memory is thinned out in units of groups in which the photoelectric conversion elements having sensitivity to each of the plurality of primary colors have predetermined arrangement.

6. The image processing device according to claim 5, wherein
the comparison result is a result of comparison after the pair of region image data are subjected to demosaicing.

7. An image processing device comprising:
an image processor that
reads out image data which is captured by an imaging element including a plurality of photoelectric conversion elements and transferred to a memory and on which optical noise is superimposed, as region image data for each of a plurality of divided regions of the memory, and
reads out data of a predetermined region again after reading for each region image data is finished; and
a display processor that outputs corrected image data obtained by correcting captured image data for each of the plurality of regions in accordance with optical noise decided in accordance with the data read out again by the image processor, the captured image data being captured by the imaging element and stored in the memory, wherein
based on a comparison result between a pair of region image data adjacent in a reading order of the image processor, the corrected image data is obtained by deciding a pixel position having the optical noise from region image data that is later in the reading order of the image processor, and correcting the captured image data for each region in accordance with the decided pixel position and an amount of the optical noise, and
the pixel position is decided based on a result of performing filter processing on the comparison result of the pair of region image data or is decided based on the comparison result of comparison after the pair of region image data are subjected to the filter processing.

8. The image processing device according to claim 1, wherein
in a case where a predetermined imaging condition is satisfied, the image processor performs processing of reading out the data again after reading for each of a plurality of the region image data is finished.

9. An image processing device comprising:
an image processor that
reads out image data which is captured by an imaging element including a plurality of photoelectric conversion elements and transferred to a memory and on which optical noise is superimposed, as region image data for each of a plurality of divided regions of the memory, and
reads out data of a predetermined region again after reading for each region image data is finished; and
a display processor that outputs corrected image data obtained by correcting captured image data for each of the plurality of regions in accordance with optical noise decided in accordance with the data read out again by the image processor, the captured image data being captured by the imaging element and stored in the memory, wherein
in a case where a predetermined imaging condition is satisfied, the image processor performs processing of reading out the data again after reading for each of a plurality of the region image data is finished, and
the imaging condition is at least one of a condition that an imaging time period of the imaging element is shorter than a predetermined time period, or a condition that an image region of which brightness exceeds predetermined brightness is present in the image data stored in the memory.

10. The image processing device according to claim 1, wherein
the image processor acquires optical noise characteristic information indicating characteristics of optical noise for each of the plurality of regions from a storage device in which the optical noise characteristic information is prestored, and
the corrected image data is obtained by correcting the captured image data for each region in accordance with the optical noise and the optical noise characteristic information acquired by the image processor.

11. The image processing device according to claim 10, wherein
the optical noise characteristic information is a value based on a ratio of a predetermined value as optical noise of the region read out again by the image processor among the plurality of regions and a predetermined value as optical noise of another region different from the region among the plurality of regions.

12. An image processing device comprising:
an image processor that reads out image data which is captured by an imaging element the imaging element including a plurality of photoelectric conversion elements and a plurality of memories each provided respectively for each of the plurality of photoelectric conversion elements and temporarily storing signal electric charges output from the plurality of photoelectric conversion elements, and transferred to the memories and on which optical noise is superimposed, as region image data for each of a plurality of divided regions of the memories; and
a display processor that outputs corrected image data obtained by correcting captured image data for each of the plurality of regions in accordance with optical noise decided in accordance with the region image data read out for each of the plurality of regions by the image processor, the captured image data being captured by the imaging element and stored in the memories.

13. The image processing device according to claim 12, wherein based on a comparison result between a pair of region image data adjacent in a reading order of the image processor, the corrected image data is obtained by deciding a pixel position having a difference from region image data that is later in the reading order of the image processor, and correcting the captured image data for each region in accordance with the decided pixel position and the difference.

14. The image processing device according to claim 1, wherein
the region is obtained by thinning out, in units of rows using a predetermined method, the memory of the photoelectric conversion elements arranged using a matrix manner.

15. The image processing device according to claim 1, wherein
the display processor performs a control for displaying, on a display, an image based on the corrected image data.

16. An imaging apparatus comprising:
the image processing device according to claim 1; and
a reception device that receives an instruction to cause the imaging element to start imaging.

* * * * *